(12) United States Patent
DeCell et al.

(10) Patent No.: US 12,217,352 B2
(45) Date of Patent: *Feb. 4, 2025

(54) SYSTEMS AND METHODS FOR SOFT SHADOWING IN 3-D RENDERING CASTING MULTIPLE RAYS FROM RAY ORIGINS

(71) Applicant: Imagination Technologies Limited, Kings Langley (GB)

(72) Inventors: Justin P. DeCell, San Francisco, CA (US); Luke T. Peterson, San Francisco, CA (US)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/211,517

(22) Filed: Jun. 19, 2023

(65) Prior Publication Data

US 2023/0334760 A1  Oct. 19, 2023

Related U.S. Application Data

(63) Continuation of application No. 17/341,250, filed on Jun. 7, 2021, now Pat. No. 11,682,159, which is a (Continued)

(51) Int. Cl.
*G06T 15/06* (2011.01)
*G06T 17/00* (2006.01)

(52) U.S. Cl.
CPC ............ *G06T 15/06* (2013.01); *G06T 17/005* (2013.01)

(58) Field of Classification Search
CPC ........ G06T 15/06; G06T 17/005; G06T 15/60
See application file for complete search history.

(56) References Cited

U.S. PATENT DOCUMENTS

| | | | |
|---|---|---|---|
| 5,313,568 A | 5/1994 | Wallace et al. | |
| 7,817,823 B1 | 10/2010 | O'Donnell | |

(Continued)

FOREIGN PATENT DOCUMENTS

| | | | |
|---|---|---|---|
| EP | 2444940 A1 | 4/2012 | |
| WO | 2004/109601 A1 | 12/2004 | |
| WO | 2013/022804 A1 | 2/2013 | |

OTHER PUBLICATIONS

Bavoil, "Advanced soft shadow mapping techniques," In Presentation at the Game Developers Conference GDC08, p. 42, 2008. http://developer.download.nvidia.com/presentations/2008/GCD08.

(Continued)

*Primary Examiner* — Maurice L. McDowell, Jr.
(74) *Attorney, Agent, or Firm* — Potomac Law Group, PLLC; Vincent M DeLuca

(57) ABSTRACT

Graphics processing systems and methods provide soft shadowing effects into rendered images. This is achieved in a simple manner which can be implemented in real-time without incurring high processing costs so it is suitable for implementation in low-cost devices. Rays are cast from positions on visible surfaces corresponding to pixel positions towards the center of a light, and occlusions of the rays are determined. The results of these determinations are used to apply soft shadows to the rendered pixel values.

20 Claims, 11 Drawing Sheets

Related U.S. Application Data continuation of application No. 16/706,584, filed on Dec. 6, 2019, now Pat. No. 11,030,795, which is a continuation of application No. 16/030,510, filed on Jul. 9, 2018, now Pat. No. 10,535,183, which is a continuation of application No. 15/059,818, filed on Mar. 3, 2016, now Pat. No. 10,049,489.

(60) Provisional application No. 62/127,439, filed on Mar. 3, 2015.

(56) References Cited

U.S. PATENT DOCUMENTS

| | | | |
|---|---|---|---|
| 8,259,110 | B1 | 9/2012 | Carr et al. |
| 9,369,975 | B2 | 6/2016 | Kim et al. |
| 10,049,489 | B2 * | 8/2018 | DeCell .................. G06T 15/06 |
| 11,030,795 | B2 | 6/2021 | DeCell et al. |
| 11,037,360 | B2 * | 6/2021 | DeCell .................. G06T 15/06 |
| 2005/0184987 | A1 | 8/2005 | Vincent et al. |
| 2009/0033661 | A1 | 2/2009 | Miller |
| 2009/0102843 | A1 | 4/2009 | Sloan et al. |
| 2009/0103793 | A1 | 4/2009 | Borland et al. |
| 2015/0109292 | A1 | 4/2015 | Lee et al. |
| 2015/0379757 | A1 | 12/2015 | Monson et al. |

OTHER PUBLICATIONS

Free Penumbra Shadows for Raymarching Distance Fields, http://iquilezles.org/www/articles/rmshadows/rmshadows.htm, Feb. 11, 2014.
Igehy, "Tracing Ray Differentials," SIGGRAPH '99. Proc. 26th Annual Conf. on Computer Graphics and Interactive Techniques, 1999, pp. 179-186.
Robison et al., "Image Space Gathering," Proc. High Performance Graphics 2009, Aug. 2009.

* cited by examiner

SYSTEMS AND METHODS FOR SOFT SHADOWING IN 3-D RENDERING CASTING MULTIPLE RAYS FROM RAY ORIGINS

CROSS-REFERENCE TO RELATED APPLICATIONS

This application is a continuation under 35 U.S.C. 120 of copending application Ser. No. 17/341,250 filed Jun. 7, 2021, now U.S. Pat. No. 11,682,159, which is a continuation of prior application Ser. No. 16/706,584 filed Dec. 6, 2019, now U.S. Pat. No. 11,030,795, which is a continuation of prior application Ser. No. 16/030,510 filed Jul. 9, 2018, now U.S. Pat. No. 10,535,183, which is a continuation of prior application Ser. No. 15/059,818 filed Mar. 3, 2016, now U.S. Pat. No. 10,049,489, which is a non-provisional under 35 U.S.C. 119 of U.S. Provisional Application Ser. No. 62/127,439 filed Mar. 3, 2015.

BACKGROUND

In one aspect, the disclosure generally relates to 3-D rendering systems, system architectures, and methods, and in a more particular aspect, the disclosure relates to systems, architectures, and methods for asynchronous and concurrent hybridized rendering, such as hybridized ray tracing and rasterization-based rendering.

Graphics Processing Units (GPUs) provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, with high performance GPUs having transistor budgets on the order of 4-6 billion transistors. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is rarely an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Shadows are important features to model in 3-D rendering. For more real-time graphics applications, lights may be modeled by point lights, which cast hard shadows. This is because point lights are much easier to model than an area light. Techniques exist to determine whether a point on a surface is occluded from the perspective of a light source. If occluded, the point is fully dark, and not occluded it is fully lit. However, realistic lights are not point lights, and realistic shadows have both umbra and penumbra.

Examples described herein relate to making soft shadow effects. Soft shadow effects can be computationally expensive, because the processing of soft shadows includes modelling how light from an area light (rather than a point light) affects a surface, which is partially occluded, and hence has portions in umbra and penumbra.

One approach to soft shadowing here is to identify visible surfaces for pixels of a frame of pixels. This can be done by ray tracing or rasterization. If by rasterization, a g-buffer can be created to maintain information such as depth, normal and surface identifier information. A "g-buffer" is a buffer of values indicating which surfaces are primarily visible in the scene at respective pixel positions, and information relating to the surfaces that are visible at those positions. The visible surfaces are surfaces of objects in a 3-D scene that are visible at one or more of the pixels. Here, the term "pixel" is used for convenience, but is intended to refer to any subdivision of an area of screen space (the frame) that is being sampled (i.e., for which aspects of the disclosure are being carried out), and does not have to correlate to any particular pre-determined concept of the term "pixel".

With the visible surfaces identified, a ray can be cast from a point within a projection of the pixel footprint onto the visible surface (sample point) towards light. Typically, this ray is cast towards the center of the light. In some examples, the sample point can be jittered within the footprint of the pixel. Jittering can be useful for avoiding aliasing problems along geometry edges. A result of each ray tracing operation is recorded. This result may include recording a distance to an occluder, if any, and also can include recording an intensity or attenuation value. For example, implementations can support translucent objects that partially attenuate. In such circumstances, there may be secondary rays emitted by the occluded object, these would be traced, and ultimately, an amount of attenuation can be determined (i.e., the secondary ray(s) can be used to determine whether the original ray would have hit or missed the light). For example, another occluder that is total or partially may be present. So, this disclosure should be understood to include any number of layers of objects that may emit further rays that are traced in order to determine what amount of occlusion is present along that ray direction.

In one implementation, there is one primary (parent) ray traced for each pixel. All of these primary rays are resolved before proceeding, in some implementations. In other implementations, a portion of the pixels can have their rays resolved (e.g., a tile worth of rays in a tile based rasterization system) can be resolved.

In some examples, for each of the rays that is occluded (i.e., for each of the rays for which the tracing indicated some occlusion), a blending kernel size and shape is calculated from a distance to the occluder. The calculation of the blending kernel size may also take into account a distance from the ray origin to the light, and/or other information relating to the light such as a shape or spatial extent of the light. The blending kernel may also be referred to as "filter parameters", and describes "blending region" over which the blending filter is to operate. The blending kernel can be calculated in world space, and then transformed into screen space based on a current projection and based on a depth. Here, these terms are used in the general sense to indicate that the blend kernel is transformed to account for projection and distance from the frame, such that even though the blending kernel may cover a large part of a world space area, that world space area may be far from the frame, such that it only appears to cover a few pixels. Conversely, a small world space area, if close to the frame, may cover more pixels.

The blending region may be centered on the pixel being operated on. For any pixel included within the blending region, occlusion information from such pixels is blended with that of the pixel being operated on. For example, a weighted interpolation is performed. Implementations also can exclude dissimilar surfaces from being included in the blending. For example, a depth similarity check can be performed. For example, if a difference between depth of the pixel being operated on and that of a nearby pixel exceeds a threshold difference, that neighboring pixel can be excluded from the blending. Here, the depth refers to a concept of how far from the frame each of the pixels is. This parameter can be expressed in a variety of ways, such as inverse depth.

The blending kernel (or more generally, "blending region") may be a box filter, with an odd number of pixels in width/height. Other kinds of filter configurations can be provided. Different filter configurations and types can be attempted. Different filter configurations can be used to model different shapes of light sources. A circular kernel may model a circular or spherical light, but a fluorescent tube may benefit from a different filter configuration. As will become clearer, so long as the filtering causes a diffusion of occlusion data from neighboring pixels into the value for the pixel being operated on, the filtering would be capable of producing a softening of the shadow, even though that particular approach may be inferior to other approaches.

The above approach handles those pixels for which there was an occluding surface. However, not all pixels would be occluded, typically. For these pixels, there would be no known occluder depth. That would mean that at least some light reaches that pixel. However, that pixel could still be in a penumbra from a nearby occluder.

For these pixels, implementations characterize lighting conditions by using neighboring occlusion information. In one approach, a search is conducted within a neighborhood (or "search region") around the pixel being processed to identify a closest pixel (closest in screen space) for which a ray found occlusion. It also can be determined whether that found pixel has a depth similar to that of the pixel being processed. If not, then that found pixel can be excluded. For those pixels that have rays that just missed an occluder, this search often would identify an adjacent pixel with a ray that showed occlusion. A distance to that pixel's occluder can be used as a proxy for a distance for the pixel being operated on (this distance is a world space distance between the visible surface and the occluder). Since this distance is used as a basis for determining blending kernel size, some implementations may simply reuse the blending kernel size, such as if the depth between these pixels is small (and given that the transformation/projection for the frame would not be changed). Some implementations may search in orthogonal directions, e.g. in a cross pattern. However the blending kernel is obtained, the same operations can be performed for blending as described above in order to determine how much the pixel should be in shadow by the neighboring occlusion.

In particular, there is provided a machine-implemented method of graphics processing, comprising:
identifying visible surfaces of a scene for pixels of a frame of pixels;
determining origins for casting rays from the visible surfaces for a plurality of pixels towards a light;
determining whether each of the rays is occluded from reaching the light;
for each of the rays that are determined to be occluded from the light, recording a distance along the ray from the surface to its respective occlusion;
for each of the rays that are determined to be not occluded from the light, searching for one or more pixels for which a ray is determined to be occluded from the light, and if at least one pixel is found in the search, determining a distance based on the distances recorded for found pixels; and
for each of the rays for which a distance is recorded:
determining a blending region for a blending filter based on the recorded distance for the ray;
transforming that blending region into the frame of pixels;
blending shadow information for pixels in the frame of pixels that are within the transformed blending region; and
using the blended shadow information to determine shadowing for one or more pixels corresponding to the ray.

Said searching for a pixel may comprise searching, within a search region for the pixel, for one or more pixels in the frame of pixels for which a ray is determined to be occluded from the light.

When applying the blending filter, depth and normal comparisons between pixels can be used to ensure that the blurring across image-space discontinuities is minimized. This protects against one object receiving shadows that are appropriate for another object located in a different part of the scene.

All depth comparisons can be weighted according to a transformed screen space distance between the pixels. For example, a lower threshold can be set for two immediately adjacent screen space pixels while a larger threshold can be set for pixels that are separated by intervening pixel(s). Depth comparisons also can be performed using a hierarchy. For example, regions of similar depth can be grouped. Depth can be expressed parametrically, for example, according to a model of a plane.

The method may further comprise, for each of the rays that are determined to be occluded from the light:
determining an attenuation value for its respective occlusion and recording the determined attenuation value, wherein the shadow information for a corresponding pixel is based on: (i) whether the ray is occluded from reaching the light, and (ii) the recorded attenuation value.

The attenuation value may represent partially opaque objects as well as regions of an occluding object where the object's geometric representation lacks sufficient resolution to faithfully represent the object's detail. For example an object with a high spatial frequency like a chain-link fence.

Said determining an attenuation value for an occlusion may comprise processing a texture for the occlusion to determine a level to which the occlusion attenuates light.

If the texture for the occlusion is opaque, the occlusion may be determined to completely attenuate light, whereas if the texture for the occlusion is translucent or punch through then the level of attenuation may be variable and may be determined by sampling the texture.

Determining an attenuation value for an occlusion may comprise casting a secondary ray from the occlusion towards the light to determine an extent to which the occlusion is itself occluded from the light.

Determining an attenuation value for an occlusion may comprise: tracking the spread of the ray; determining an area of the intersection of the ray with its respective occlusion; and analysing the area of the intersection to determine the attenuation value. Said tracking the spread of the ray may comprise setting an initial spread of the ray cast from the visible surface for the corresponding pixel based on the depth of the visible surface in the scene, the surface normal of the visible surface, and possibly the material properties of the visible surface.

When a texture is used to determine an attenuation value, the mip map level of the texture may be chosen based on the spread of the ray.

The origin for casting a ray from a visible surface for a pixel may be determined by projecting a centre position of a footprint of the pixel in screen space into the scene and identifying a position on the visible surface.

The origins for casting rays from the visible surfaces for the pixels may be jittered within footprints of the respective pixels. Jittering an origin for casting a ray from the visible surface for a pixel may comprise adding a two dimensional noise value to the centre position of the pixel in screen space to determine a jittered pixel position, projecting the jittered pixel position into the scene and identifying a position on a plane corresponding to the visible surface.

One way to accomplish the jittering is to translate the 2-dimensional screen-space noise into variations in the directions of the "virtual camera rays" between the view perspective and the visible surface, and then derive the new virtual intersection point by intersecting the virtual ray with a plane created from the intersection point and the normal value of the visible surface. This virtual intersection point can become the origin for the shadow ray.

The method may further comprise determining rendered pixel values of the frame in accordance with the determined shadowing for the pixels.

There is further provided a graphics processing unit configured to render a frame representing a scene, the graphics processing unit comprising:
  surface identification logic configured to identify surfaces within the scene; and
  processing logic configured to process graphics data for identified surfaces;
  wherein the graphics processing unit is configured to:
    identify visible surfaces of the scene for pixels of the frame;
    determine origins for casting rays from the visible surfaces for a plurality of the pixels towards a light;
    determine whether each of the rays is occluded from reaching the light;
    for each of the rays that are determined to be occluded from the light, record a distance along the ray from the surface to its respective occlusion;
    for each of the rays that are determined to be not occluded from the light, search for one or more pixel for which a ray is determined to be occluded from the light, and if at least one pixel is found in the search, determine a distance based on the distances recorded for the found pixels; and
    for each of the rays for which a distance is recorded:
      determine a blending region for a blending filter based on the recorded distance for the ray;
      transform that blending region into the frame of pixels;
      blend shadow information for pixels in the frame of pixels that are within the transformed blending region; and
      use the blended shadow information to determine shadowing for one or more pixels corresponding to the ray.

The graphics processing unit may be further configured to, for each of the rays that are determined to be occluded from the light:
  determine an attenuation value for its respective occlusion by processing a texture for the occlusion to determine a level to which the occlusion attenuates light; and
  record the determined attenuation value, wherein the shadow information for a corresponding pixel is based on one or both of: (i) whether the ray is occluded from reaching the light, and (ii) the recorded attenuation value.

The graphics processing unit may be configured to determine an attenuation value for an occlusion by: tracking the spread of the ray; determining an area of the intersection of the ray with its respective occlusion; and analysing the area of the intersection to determine the attenuation value.

The graphics processing unit may further comprise a buffer configured to store the shadow information and the recorded distances for the pixels.

The surface identification logic may comprise rasterisation surface identification logic and ray tracing surface identification logic, wherein the graphics processing unit may further comprises a normaliser coupled to the rasterisation surface identification logic and to the ray tracing surface identification logic, the normaliser being configured to form a normalised set of shader inputs to be provided to the processing logic irrespective of whether surfaces are identified by the rasterisation surface identification logic or the ray tracing surface identification logic.

In another approach, an estimate of how close a nearest occluder is to the ray can be determined. From that estimate, a conic section may be characterized, and mapped to how much of the light would fall outside of that conic section. In other words, the conic section is limited by how wide the cone angle can be before the cone starts to become occluded by the occluder. Then, the area of that cone may be considered to be unoccluded, and an intensity of light can be occluded accordingly.

There is still further provided a machine-implemented method of graphics processing, wherein positions of primitives in a scene are represented by nodes of a hierarchical acceleration structure, the method comprising:
  using the hierarchical acceleration structure to identify visible surfaces of a scene for pixels of a frame of pixels;
  determining origins for casting rays from the visible surfaces towards a light;
  determining whether each of the rays is occluded from reaching the light; and
  for one or more of the rays that are determined to be not occluded from the light:
    identifying a nearest-hit primitive by determining which of the nodes of the hierarchical acceleration structure to be hit by the ray has the smallest distance-ratio, wherein a distance-ratio for a node is the ratio of a dimension of the node and the distance along the ray at which the ray hits the node; and
    determining an extent of occlusion from the light for one or more pixels corresponding to the ray origin in accordance with data relating to the determined node having the smallest distance-ratio.

Data relating to the determined node having the smallest distance-ratio may include one or both of: (i) an indication of said dimension of the node and an indication of the distance along the ray at which the ray hits the node, and (ii) the distance-ratio of the determined node.

Determining an extent of occlusion from the light for the one or more pixels corresponding to the ray origin may comprise determining an angle corresponding to the distance-ratio of the determined node, and using the determined angle to determine the extent of occlusion from the light.

The nodes may be voxels which are determined in accordance with an octree structure.

Identifying a nearest-hit primitive for a ray may comprise:
storing a closest hit distance-ratio for the ray;
descending within the hierarchical acceleration structure from a current level for a test primitive being tested if the current node corresponding to the test primitive at the current level is a hit for the ray and if the distance-ratio for the current node is smaller than the stored closest hit distance-ratio for the ray; and
updating the stored closest hit distance-ratio for the ray in response to descending within the hierarchical acceleration structure.

A node of the hierarchical acceleration structure with a relatively low distance-ratio may be selectively descended before a node of the hierarchical acceleration structure with a relatively high distance-ratio.

The hierarchical acceleration structure may be traversed in a depth-first manner.

Determining an extent of occlusion from the light for the one or more pixels corresponding to the ray origin may further use information relating to the light. The information relating to the light may comprise one or more of: a position of the light in the scene; a distance of the light from the origin of the ray; a spatial extent of the light in the scene; and a spatial extent of the light as viewed along the direction of the ray.

Determining an extent of occlusion from the light for the one or more pixels corresponding to the ray origin may comprise determining an attenuation value for the nearest-hit primitive for the ray and using the determined attenuation value to determine the extent of occlusion.

The method may further comprise:
for each of the rays that are determined to be occluded from the light:
recording a distance along the ray from the surface to its respective occlusion;
determining a blending region for a blending filter based on the recorded distance for the ray;
transforming that blending region into the frame of pixels;
blending shadow information for pixels in the frame of pixels that are within the transformed blending region; and
using the blended shadow information to determine shadowing for the one or more pixels corresponding to the ray origin.

The method may further comprise determining rendered pixel values of the frame in accordance with the determined extents of occlusion from the light for the pixels.

There is provided a graphics processing unit configured to render a frame representing a scene, wherein positions of primitives in the scene are represented by nodes of a hierarchical acceleration structure, the graphics processing unit comprising:

surface identification logic configured to identify surfaces within the scene; and
processing logic configured to process graphics data for identified surfaces;
wherein the graphics processing unit is configured to:
use the hierarchical acceleration structure to identify visible surfaces of a scene for pixels of a frame of pixels;
determine origins for casting rays from the visible surfaces towards a light;
determine whether each of the rays is occluded from reaching the light; and
for one or more of the rays that are determined to be not occluded from the light:
identify a nearest-hit primitive by determining which of the nodes of the hierarchical acceleration structure to be hit by the ray has the smallest distance-ratio, wherein a distance-ratio for a node is the ratio of a dimension of the node and the distance along the ray at which the ray hits the node; and
determine an extent of occlusion from the light for one or more pixels corresponding to the ray origin in accordance with data relating to the determined node having the smallest distance-ratio.

The graphics processing unit may be configured to determine the extent of occlusion from the light for the one or more pixels corresponding to a ray origin by determining an angle corresponding to the distance-ratio of the determined node, and using the determined angle to determine the extent of occlusion from the light.

The graphics processing unit may be configured to identify a nearest-hit primitive for a ray by:
storing a closest hit distance-ratio for the ray;
descending within the hierarchical acceleration structure from a current level for a test primitive being tested if the current node corresponding to the test primitive at the current level is a hit for the ray and if the distance-ratio for the current node is smaller than the stored closest hit distance-ratio for the ray; and
updating the stored closest hit distance-ratio for the ray in response to descending within the hierarchical acceleration structure.

The graphics processing unit may be configured to determine an extent of occlusion from the light for a pixel further using information relating to the light.

The graphics processing unit may further comprise a buffer configured to store, for each of said one or more rays, a distance-ratio of the nearest-hit primitive for the ray.

The graphics processing unit may be configured to, for each of the rays that are determined to be occluded from the light:
record a distance along the ray from the surface to its respective occlusion;
determine a blending region for a blending filter based on the recorded distance for the ray;
transform that blending region into the frame of pixels;
blend shadow information for pixels in the frame of pixels that are within the transformed blending region; and
use the blended shadow information to determine shadowing for the one or more pixels corresponding to the ray origin.

There is still further provided a machine-implemented method of graphics processing, comprising:
identifying visible surfaces of a scene for pixels of a frame of pixels;

determining origins for casting rays from the visible surfaces towards a light;

for one or more of the ray origins:
casting multiple test rays from the determined origin towards different points within the light;
determining whether each of the test rays are occluded from reaching the light;
using the results of said determining whether the test rays are occluded from reaching the light to determine an extent of occlusion from the light for one or more pixels corresponding to the ray origin.

For example, the results of determining whether the test rays are occluded from reaching the area light can be used to determine a glancing ray which is the closest ray to an occlusion which is not occluded by the occlusion, wherein an angle between the glancing ray and a ray cast towards to the centre of the area light is used to determine an extent of occlusion from the light for the pixel. For example, this angle may define an unoccluded conic section which can be used to represent a portion of the light that is unoccluded.

There is still further provided a machine-implemented method of graphics processing for rendering a frame representing a scene which is lit by one or more lights, comprising:
identifying visible surfaces of the scene for pixels of the frame;
determining a position on an identified visible surface within the scene for each of the pixels;
for each of the determined positions for the pixels, determining components of a directionalized distance function which indicates a direction-dependent distance to one or more occlusions of light in the scene for the position; and
using the determined components of the directionalized distance function and information relating to said one or more lights to determine shadow information for pixels in the frame.

The one or more lights may comprise a plurality of lights.

The components of the directionalized distance function may be spherical harmonic components.

The components of the directionalized distance function may be defined with respect to a three-dimensional Cartesian coordinate system.

When there are a plurality of lights, said determining components of the directionalized distance function for a determined position for a pixel may comprise:
for each of the lights:
casting a ray from the identified visible surface in a direction towards the light;
determining whether each of the rays is occluded from reaching the light; and
for each of the rays that are determined to be occluded from the light, recording a distance along the ray from the surface to its respective occlusion; and
combining recorded distances to occlusions for the lights to thereby determine the components of the directionalized distance function for the determined position.

Determining components of the directionalized distance function may further comprise:
for each of the lights:
for each of the rays that are determined to be not occluded from the light, searching for a pixel for which a ray is determined to be occluded from the light, and if a pixel is found in the search, recording the distance that was recorded for the ray of the found pixel.

Searching for a pixel may comprise searching, within a search region for the pixel, for a closest pixel in the frame of pixels for which a ray is determined to be occluded from the light.

Determining components of the directionalized distance function for a determined position for a pixel may comprise:
for each of a plurality of sampling directions:
casting a ray from the identified visible surface in the sampling direction;
determining whether each of the rays is occluded from reaching a light in the sampling direction; and
for each of the rays that are determined to be occluded from a light in the sampling direction, recording a distance along the ray from the surface to its respective occlusion; and
combining recorded distances to occlusions for the sampling directions to thereby determine the components of the directionalized distance function for the determined position.

The sampling directions may be selected stochastically or in accordance with a predetermined pattern.

Determining shadow information for pixels in the frame may comprise:
for each of the lights:
using the determined components of the directionalized distance function to estimate a distance to an occlusion, if any, in the direction of the light for each of the pixels;
for pixels for which a distance to an occlusion is estimated:
determining a blending region for a blending filter based on the estimated distance for the pixel;
transforming that blending region into the frame of pixels; and
blending shadow information for pixels in the frame of pixels that are within the transformed blending region; and
for each of a plurality of pixels in the frame, combining the blended shadow information for the pixel determined for the lights to thereby determine shadowing for the pixel.

The shadow information for a pixel for a light may be based on whether a ray cast from the determined position for the pixel is occluded from reaching the light.

The shadow information for a pixel for which a ray is occluded from the light may be further based on an attenuation value for its respective occlusion.

The method may further comprise determining an attenuation value for an occlusion by processing a texture for the occlusion to determine a level to which the occlusion attenuates light.

Determining an attenuation value for an occlusion may further comprise casting a secondary ray from the occlusion towards the light to determine an extent to which the occlusion is itself occluded from the light.

The method may further comprise determining rendered pixel values of the frame in accordance with the determined shadowing for the pixels.

There is still further provided a graphics processing unit configured to render a frame representing a scene which is lit by one or more lights, the graphics processing unit comprising:
surface identification logic configured to identify surfaces within the scene; and
processing logic configured to process graphics data for identified surfaces;

wherein the graphics processing unit is configured to:
  identify visible surfaces of the scene for pixels of the frame;
  determine a position on an identified visible surface within the scene for each of the pixels;
  for each of the determined positions for the pixels, determine components of a directionalized distance function which indicates a direction-dependent distance to one or more occlusions of light in the scene for the position; and
  use the determined components of the directionalized distance function and information relating to said one or more lights to determine shadow information for pixels in the frame.

The graphics processing unit may further comprise a buffer configured to store the shadow information and the components of the directionalized distance function for the pixels.

The surface identification logic may comprise rasterisation surface identification logic and ray tracing surface identification logic, and wherein the graphics processing unit may further comprise a normaliser, coupled to the rasterisation surface identification logic and to the ray tracing surface identification logic, the normaliser being configured to: form a normalised set of shader inputs to be provided to the processing logic, irrespective of whether surfaces are identified by the rasterisation surface identification logic or the ray tracing surface identification logic.

The graphics processing systems described herein may be embodied in hardware on an integrated circuit. There may be provided a method of manufacturing, at an integrated circuit manufacturing system, a graphics processing unit as described herein. There may be provided an integrated circuit definition dataset that, when processed in an integrated circuit manufacturing system, configures the system to manufacture a graphics processing unit as described herein. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing unit as described herein.

Furthermore, there may be provided an integrated circuit manufacturing system comprising:
  a non-transitory computer readable storage medium having stored thereon a computer readable integrated circuit description that describes a graphics processing unit as described herein;
  a layout processing system configured to process the integrated circuit description so as to generate a circuit layout description of an integrated circuit embodying a graphics processing unit as described herein; and
  an integrated circuit generation system configured to manufacture a graphics processing unit as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a person skilled in the art, and may be combined with any of the aspects of the examples described herein.

BRIEF DESCRIPTION OF THE DRAWINGS

Examples will now be described in detail with reference to the accompanying drawings in which.

Figure 1A:
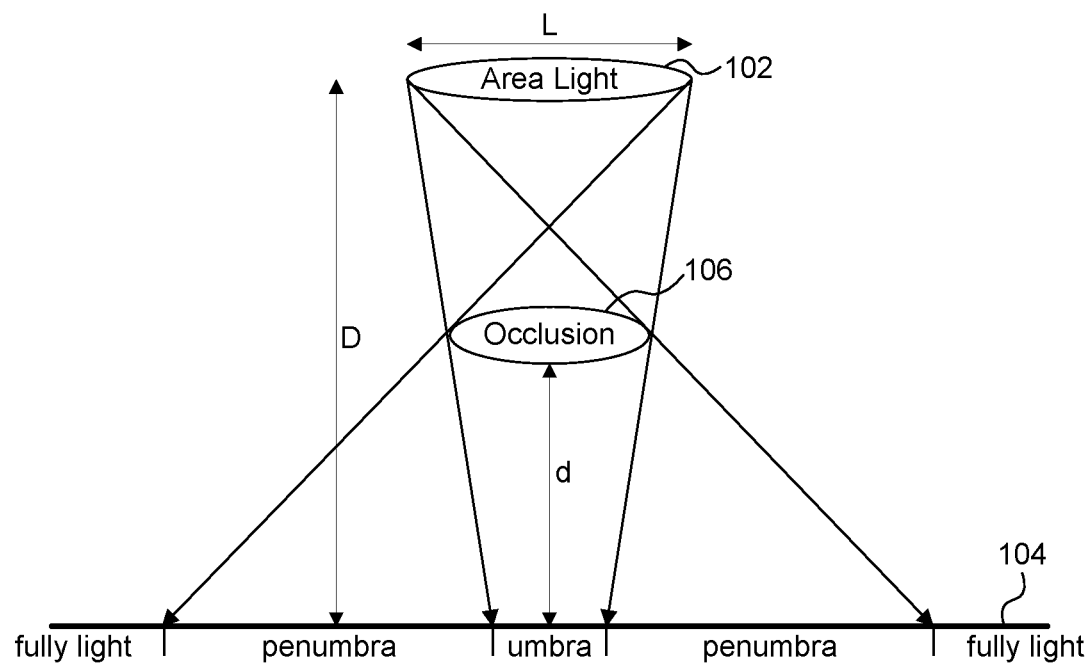
FIG. 1a shows how soft shadows are cast by an occlusion in a first example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, hard shadows (e.g. cast by point lights) are relatively simple to render. For hard shadows, a ray can be cast from a surface position corresponding to a pixel towards a light; if the ray hits an occluder then the pixel is in shadow, and if the ray does not hit an occluder then the pixel is not in shadow and is illuminated by the light. However, in reality, many shadows are soft shadows, e.g. because light sources are not infinitely small points and because scattering occurs between light surfaces and surfaces in a scene.

FIG. 1a shows a first example of an area light 102 (i.e. not a point light) which illuminates a scene including a visible surface 104 and an occlusion 106. Regions of the surface 104 which are in view of the entire area light 102 are fully lit, and regions of the surface 104 which are occluded from the entire light 102 by the occlusion 106 are in full shadow (which may be referred to as "umbra"). The region where a shadow transitions between fully lit and fully in shadow is called the "penumbra". Regions of the surface 104 which is in the penumbra are occluded from some, but not all, of the light 102 by the occlusion 106.

Figure 1B:
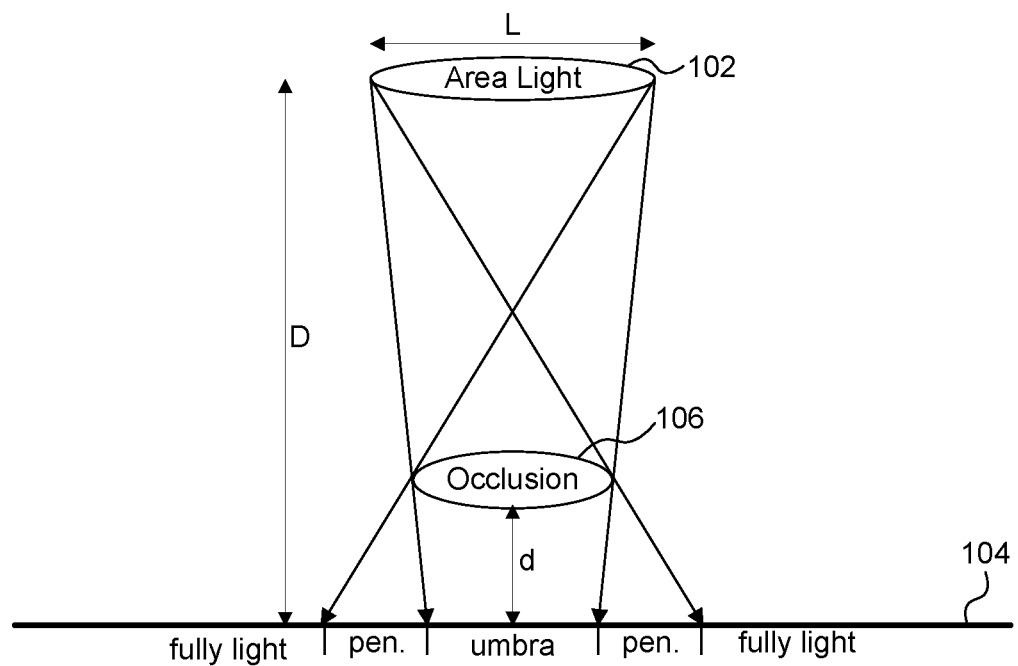
FIG. 1b shows how soft shadows are cast by an occlusion in a second example.

FIG. 1b shows a second example, similar to the first example, in which the occlusion 106 is closer to the surface 104. The two examples shown in FIGS. 1a and 1b illustrate that the penumbra size is dependent upon the ratio of the distance (d) from the surface 104 to the occlusion 106 and the distance (D) from the surface 104 to the light 102. The size of the penumbra created by an edge of the occlusion 106 is also dependent upon the spatial extent (L) of the area light 102.

Figure 2:
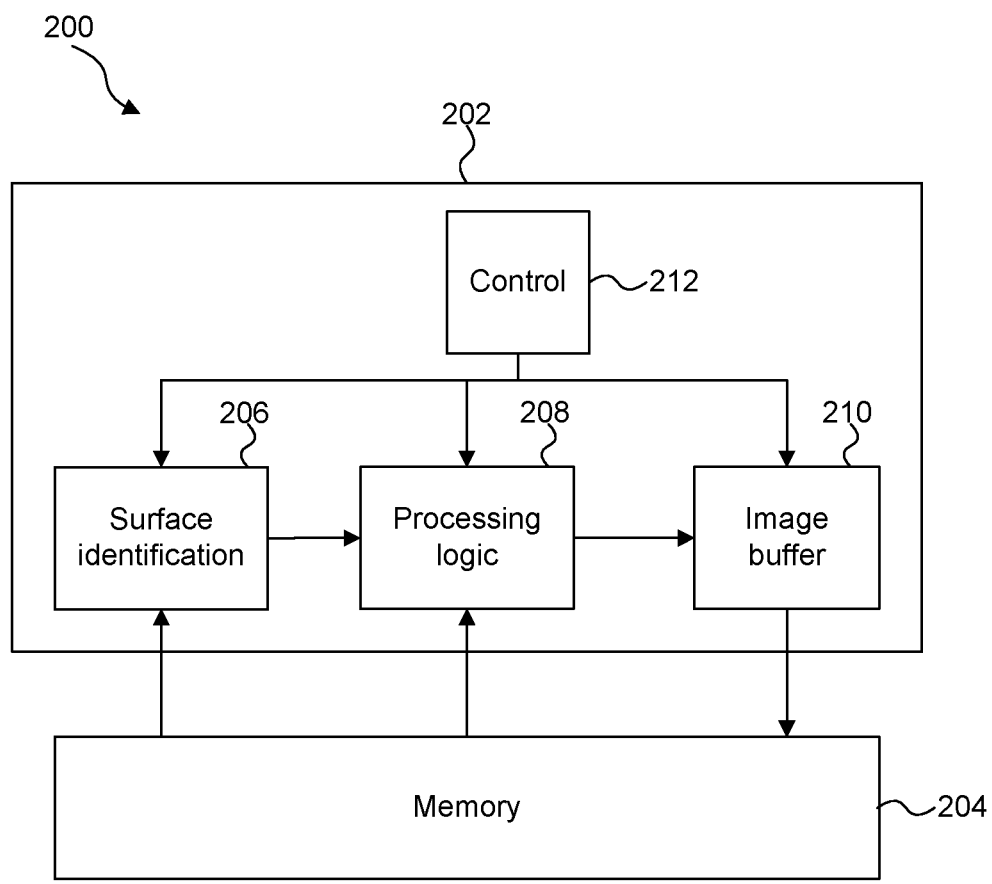
FIG. 2 shows a graphics processing system.

FIG. 2 illustrates a graphics processing system 200 which comprises a graphics processing unit 202 and a memory 204. The graphics processing unit 202 comprises surface identification logic 206, processing logic 208, an image buffer 210 and control logic 212. The surface identification logic is configured to identify surfaces within a scene being rendered. The processing logic 208 comprises one or more execution cores and is configured to process graphics data for surfaces identified by the surface identification logic 206. The image buffer is configured to store rendered pixel values. The control logic 212 is configured to control the operation of the graphics processing system 200.

A first example of the operation of the graphics processing system 200 is described with reference to the flow chart in FIG. 3.

Graphics data representing objects in a scene is received at the graphics processing unit 202. The graphics data may comprise primitives which represent surfaces of objects to be rendered. Primitives are often triangles, but can take other forms, e.g. other two-dimensional shapes, or points or lines. A primitive may be defined by a set of vertices, e.g. three vertices define a triangular primitive. The graphics data may include vertex data (e.g. position data and attribute data, such as texture data) for the vertices of the primitives in the scene and indications for the primitives to indicate which of the vertices form the primitives.

In step S302 the surface identification logic 206 identifies visible surfaces for pixels of a frame. In other words, a frame is to be rendered to represent a view of the scene from a particular viewpoint, and the frame comprises an array of pixel positions. For each pixel position of the frame, a surface in the scene, which is primarily visible in that pixel, is identified in step S302. Indications of the visible surfaces for the pixels are provided from the surface identification logic 206 to the processing logic 208. One or more different methods may be used by the surface identification logic 206 to identify visible surfaces for the pixels in the scene, e.g. rasterisation or ray tracing may be used to identify visible surfaces. Methods of rasterisation and methods of ray tracing for identifying visible surfaces for pixels are known in the art, and as such for conciseness, the details of those methods are not described in detail herein.

Figure 4:
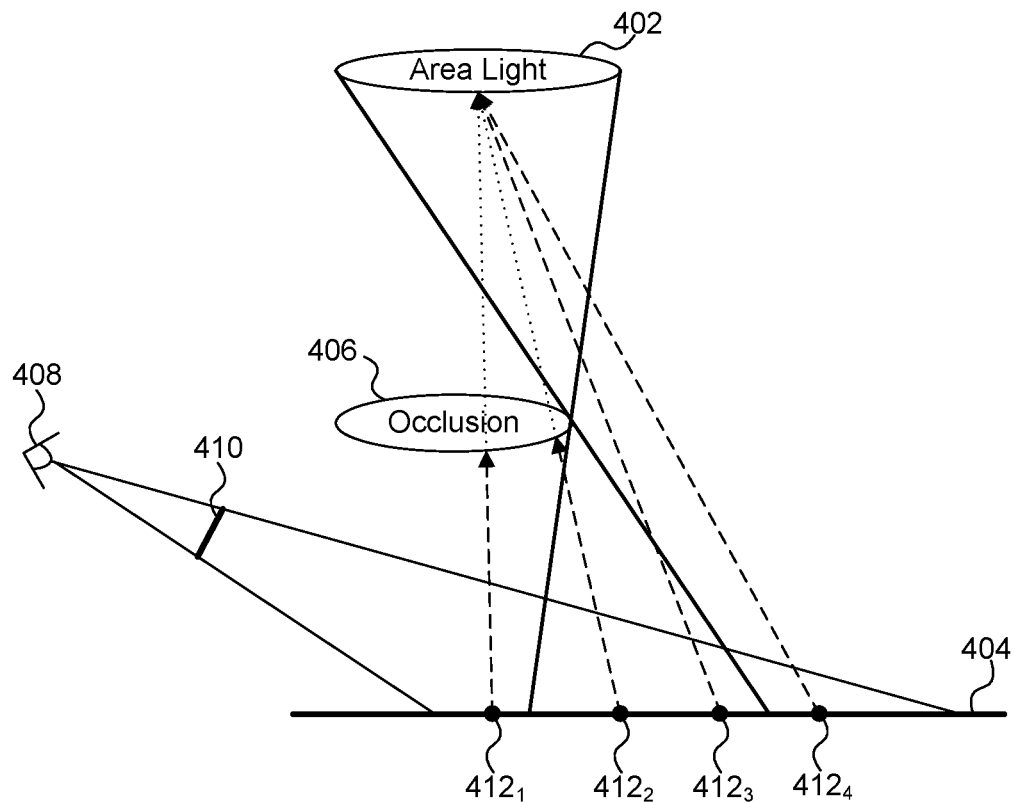
FIG. 4 illustrates a scene to be rendered from a viewpoint.

FIG. 4 shows a simple example of part of a scene including an area light 402, a visible surface 404 and an occlusion 406. The viewpoint from which the scene is viewed is shown at 408 and the view plane of the frame to be rendered is represented at 410. In this simple example only one visible surface is shown, but it should be appreciated that in other examples there may be many visible surfaces within the scene.

In step S304 the processing logic 208 determines an origin for casting a ray from the visible surface 404 for each of the pixels towards the light 402. The points $412_1$, $412_2$, $412_3$ and $412_4$ represent four positions on the visible surface 404 which correspond to four pixels of the frame, and these four positions 412 are the determined origins of the rays for those four pixels. It can be seen that position $412_1$ is in the umbra (i.e. full shadow) region, positions $412_2$ and $412_3$ are in the penumbra and position $412_4$ is not in shadow at all. The rays are cast from the determined positions 412 towards the centre of the light 402. It is noted that in this example, one ray is cast for a position corresponding to each pixel. This makes the examples described herein much simpler to implement than if multiple rays were cast from each position towards different parts of the area light 402. In particular, this may allow the methods described herein to be implemented in real-time and/or on devices, such as mobile devices, which may have tight constraints on the processing resources, physical size and/or power consumption of a graphics processing unit implemented thereon.

It is not necessary to cast a ray for every pixel, and in some cases sub-sampling techniques may be used. Similarly, it may be desirable to cast multiple rays from a single pixel in some circumstances.

In step S306 the processing logic 208 determines whether each of the rays is occluded from reaching the area light 402. In the example shown in FIG. 4, the rays cast from positions $412_1$ and $412_2$ are occluded, but the rays cast from positions $412_3$ and $412_4$ are not occluded.

The penumbra can be considered to be made up of two distinct regions: a first region for which rays are occluded from the centre of the light 402, and a second region for which rays are not occluded from the centre of the light 402. For the first region (e.g. including position $412_2$) a process of "erosion" of a corresponding hard shadow region can be applied to determine the soft shadowing effect in this part of the penumbra. For the second region (e.g. including position $412_3$) a process of "dilation" of a corresponding hard shadow region can be applied to determine the soft shadowing effect in this part of the penumbra.

In step S308 for each of the rays that are determined to be occluded from the light 402 (e.g. the rays from positions $412_1$ and $412_2$), a distance along the ray from the surface 404 to the occlusion 406 is recorded. In particular, the processing logic 208 maintains a buffer to record a distance for each pixel position of the frame being rendered. The distance values might be quantised, or otherwise compressed, for storage in the buffer to reduce the storage requirements of the buffer.

In some examples, the processing logic 208 also determines an attenuation value for the occlusion 406. The attenuation value may be stored in a buffer for each ray that is occluded by the occlusion 406. In this way the processing logic 208 can record a distance and an attenuation factor for each pixel position of the frame. It is noted that in some examples, an attenuation value is not determined or recorded for the rays, e.g. because this is simpler to implement, or because all or most of the geometry is opaque in the scene.

Storing an attenuation value enables shadows cast by non-opaque occlusions (e.g. occlusions which are at least partially translucent or have "punch-through" textures) to be modelled.

Sometimes the attenuation value can contain multiple channels, e.g. red, green, and blue. This allows shadow casting objects to exhibit a "stained glass" effect where they selectively attenuate certain light colours and not others, causing tinted shadows on the shadow receiving surface.

For example, an attenuation value for the occlusion 406 may be determined by processing a texture for the occlusion 406 to determine a level to which the occlusion 406 attenuates light. For example, if the texture to be applied to the occlusion 406 is opaque then the occlusion is determined to completely attenuate light. However, if the texture to be applied to the occlusion 406 is translucent or punch through then the level of attenuation is variable and is determined by sampling the texture. In this way, the shadowing of the pixel corresponding to positions $412_1$ and $412_2$ can take account of any light that may pass through the occlusion 406 due to a translucent or punch through texture. A 'punch through' texture is a texture which includes some "holes" such that light can pass through the occlusion 406.

The determination of an attenuation value for the occlusion 406 may include casting a secondary ray from the occlusion 406 towards the light 402 (as represented by the dotted lines in FIG. 4) to determine an extent to which the occlusion 406 is itself occluded from the light 402. For example, there could be another occlusion in the scene which blocks any light travelling from the light 402 to the occlusion 406, in which case even if the occlusion is translucent then the attenuation value recorded for pixels corresponding to positions $412_1$ and $412_2$ is set to indicate that the light from the centre of the area light 402 is totally attenuated.

The determination of an attenuation value for the occlusion 406 may comprise tracking the spread of a ray and determining an area of the intersection of the ray with the occlusion 406. The area of the intersection can be analysed to determine the attenuation value. Tracking the spread of a ray as it moves through space can help to combat aliasing, especially in punch-through textures. The ray can be thought of as a cone segment for the purposes of anti-aliasing. This allows shading at the ray intersection to evaluate an integral across the surface as opposed to a point sample. This effectively eliminates aliasing caused when sampling a punch through object, because the cone allows an appropriate MIP level of a texture to be selected, and then a partial attenuation value (somewhere between 0.0 and 1.0) can be used. In cases where the shadow of a high frequency texture is viewed with insufficient screen resolution to enable all of the texture detail to be seen in the shadow, this allows for appropriate blurring instead of aliasing. One implementation of tracking ray spread is called "ray differentials".

When tracking the spread of a ray, an initial spread of the ray cast from the visible surface for the corresponding pixel can be set based on the depth of the visible surface in the scene and the surface normal of the visible surface. For example, in a hybrid context, (where rasterization is used instead of ray tracing for primary rays), the initial spread of a ray is set based on what the ray spread would have been from the surface point as seen from a virtual camera that corresponds to the view projection. To combat aliasing most effectively, the ray's spread should track the area as viewed from a single pixel, allowing effective integration across all data effectively sampled for that pixel. The processing logic 208 can track x and y divergence separately. A constant representing the distance between pixels in the camera projection can be scaled by the depth value which represents the distance from the view plane 410 to the first visible object (the object receiving the shadow, which in FIG. 4 is the surface 404), and then the divergence in the x and y axes can each be set taking into account the normal at the point the object is being rendered (e.g. the normal at the points 412). Said another way, this is projecting the pixel onto the visible surface 404, and initializing the ray's spread tracking values based on this projected pixel footprint.

In step S310, for rays that are not occluded (e.g. rays from positions $412_3$ and $412_4$) the processing logic 208 searches for a pixel for which a ray is occluded, and if a pixel is found in the search then the distance recorded for that found pixel is recorded for the current pixel or element being operated on. For example, the processing logic 208 may search, within a search region for the current pixel, for a closest pixel in the frame of pixels for which a ray is determined to be occluded from the light. The search region may be defined in the space of the frame pixels being rendered, e.g. it may be a 5×5 block of pixels of the frame centred on the current pixel. The search region may be a different size and/or shape in different examples. Furthermore, search in the might only take account of pixels in the search region if they are deemed to be showing a similar surface as the current pixel. For example, a depth similarity check or another discontinuity check can be performed. For example, if a difference between the depth of the pixel being operated on and that of a nearby pixel exceeds a threshold difference, that neighbouring pixel can be excluded from the search. The search kernel may have a constant search pattern, e.g. a cross-shaped kernel provides a good trade-off between cost and performance, whilst a box pattern may provide better results but is more expensive to implement. A stochastic tap pattern could be used as a blending region, which may be different for each pixel, which can give the lowest artefacts at the expense of creating some image noise.

Of the pixels that are found in the search for which a ray is occluded, the closest of those found pixels to the current pixel may be selected. The distance recorded for the selected pixel is used as a proxy to represent the distance from the current pixel to the occlusion 406, and as such that distance is recorded in the distance buffer for the current pixel, even though the current pixel is not occluded from the centre of the light 402. For example, the search for the pixel corresponding to position $412_3$ might find the pixel corresponding to position $412_2$ in its search region, and as such the distance recorded for position $412_2$ is also recorded for position $412_3$. Alternatively the distances from multiple of the found pixels may be blended together to form a representative distance for the non-occluded pixel.

If the search does not find a pixel in the search region for which a ray is occluded then this may indicate that the current pixel is fully lit. For example, the search for the pixel corresponding to position $412_4$ might not find any pixels in its search region for which a ray is occluded.

In step S312, the processing logic 208 performs various steps for each of the rays for which a distance is recorded (i.e. for pixels which are at least partially in shadow). Parameters for a blending filter (i.e. a "blending region" or "blending kernel") is determined for a ray based on the recorded distance. As described above, the closer the occlusion 406 is to the surface 404, the smaller the penumbra, and as such the smaller the determined blending kernel would be.

Figure 5:
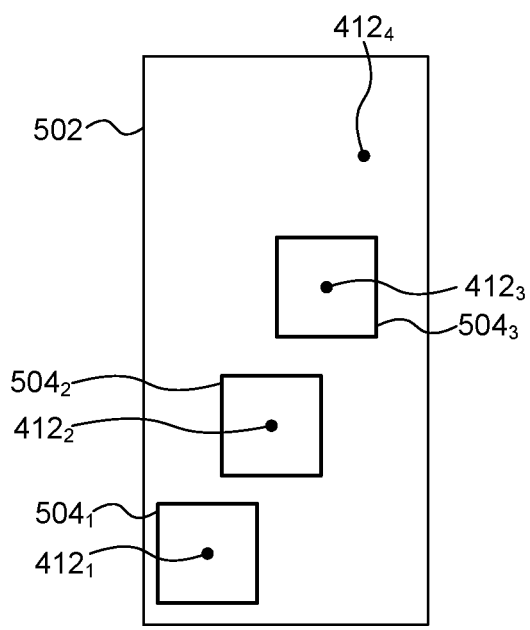
FIG. 5 illustrates blending footprints for positions on a visible surface in the scene.

FIG. 5 illustrates a visible region 502 of the surface 404, as viewed from above the surface 404. The view plane 410 may for example be square and the projection of that view plane 410 onto the surface 404 results in an elongated rectangle 502. The four positions $412_1$ to $412_4$ are shown in FIG. 5. Blending kernels $504_1$, $504_2$ and $504_3$ are illustrated which have been determined for the respective positions $412_1$, $412_2$ and $412_3$. It can be seen that the blending kernels are approximately the same size because they are based on the distance from the positions $412_1$ and $412_2$ to the occlusion $406$. Since position $412_4$ is fully lit, no blending kernel is determined for this position. In this example, the blending kernels are symmetric in x and y directions on the surface $404$.

Figure 6:
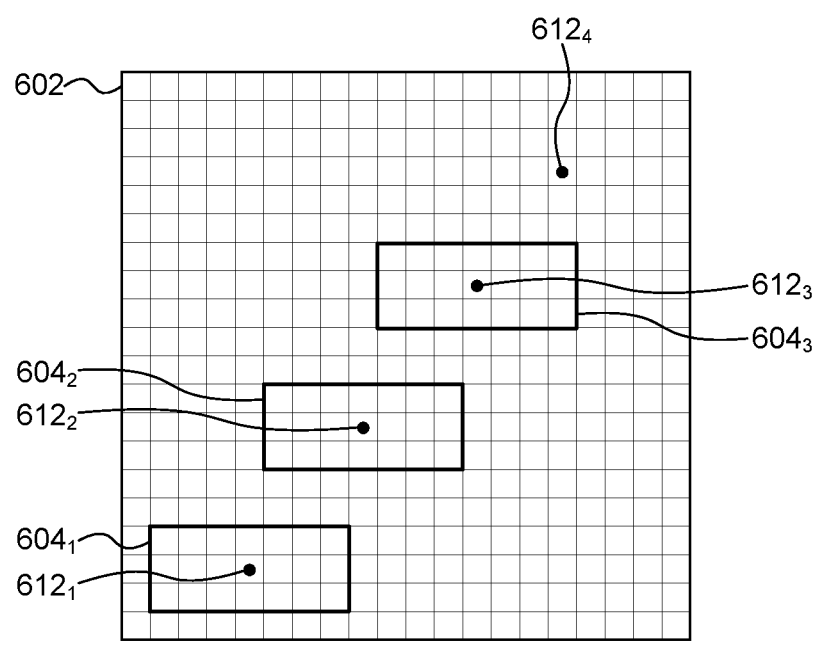
FIG. 6 illustrates the blending footprints transformed in the frame of pixels.

The blending kernels are transformed into the frame of pixels. FIG. 6 shows an example of a frame of pixels $602$. Each pixel in the frame can map onto a region in the scene. The mapping does not always preserve the shape of the pixel because of perspective effects. Similarly, a region of the scene can map backwards into one or multiple pixels in the frame. The pixel $612_1$ corresponds to the position $412_1$; the pixel $612_2$ corresponds to the position $412_2$; the pixel $612_3$ corresponds to the position $412_3$; and the pixel $612_4$ corresponds to the position $412_4$. The grid lines shown in FIG. 6 represent the boundaries between regions in the frame. This transformation back into screen-space is one of the parameters to a filter kernel. The blending kernel $504_1$ for the position $412_1$ is transformed into the frame as shown as $604_1$; the blending kernel $504_2$ for the position $412_2$ is transformed into the frame as shown as $604_2$; and the blending kernel $504_3$ for the position $412_3$ is transformed into the frame as shown as $604_3$. It can be seen that transformation has affected the shape of the blending kernels. In particular, the square blending kernels on the surface $404$ are elongated in the horizontal direction to be rectangles in the frame $602$.

Shadow information for pixels within a transformed blending kernel can be blended. For example, the shadow information for a pixel may include an indication as to whether the ray for that pixel was occluded from reaching the centre of the light $402$. The shadow information for a pixel may also include the attenuation values which are recorded for the pixels. The blending of the shadow information may comprise combining the values (e.g. flag bits indicating whether the rays for the pixels in the blending kernel were occluded from reaching the centre of the light $402$, and/or the attenuation values). The "combining" may include averaging, summing, interpolating, or performing some other function on the values for the pixels within the blending kernel. The blending may only take into account pixels within the blending kernel if those pixels are deemed to be showing a similar surface as the current pixel. For example, a depth similarity check can be performed. For example, if a difference between the depth of the pixel being operated on and that of another pixel within the blending kernel exceeds a threshold difference, that neighbouring pixel can be excluded from the blending process. A kernel where pixels are selected stochastically can also be used. In addition, pixels nearer the object pixel may be weighted more heavily in determining the overall shadow value.

The blended shadow information from a blending kernel (e.g. kernel $604_1$) is used to determine shadowing for the pixel associated with that blending kernel (e.g. pixel $612_1$). For example, a lighting factor can be determined to indicate a level to which the pixel is to be lit by the light $402$ in the rendered image. In this way soft shadow effects can be implemented.

In step S314 the processing logic $208$ determines rendered pixel values in accordance with the determined shadowing for the pixels. For example, the processing logic $208$ renders a pixel and as part of the rendering process it applies lighting to the pixel in accordance with the indicated level to which the pixel is to be lit by the light $402$.

A simple example is now described with reference to the example shown in FIGS. 4 to 6, in which the occlusion $406$ is opaque such that the attenuation value for occluded pixels indicates 'totally occluded' from the light $402$, and the shadow information for a pixel is simply a shadow indicator indicating whether the ray for the pixel was occluded from reaching the centre of the light $402$, e.g. with a value of 1 representing occluded and a value of 0 representing not occluded. The pixels within the blending kernel $604_1$ may all be occluded from the centre of the light $402$, so if the flag bits are averaged over the blending kernel $604_1$ the final value will be 1, indicating that the pixel $612_1$ is in full shadow from the light $402$.

The pixel $612_2$ has a shadow indicator of 1 indicating that it is occluded from the centre of the light $402$. However, the blending kernel $604_2$ may include some pixels which are occluded from the centre of the light $402$ and some pixels which are not occluded from the centre of the light $402$. So if the shadow indicators are averaged over the blending kernel $604_2$ the final value will be somewhere between 0 and 1, indicating that the pixel $612_2$ is in partial shadow from the light $402$, i.e. it is in the penumbra. The blended values have multiple bits (e.g. 4 bits) so that they can represent values between 0 and 1.

The pixel $612_3$ has a shadow indicator of 0 indicating that it is not occluded from the centre of the light $402$. However, the blending kernel $604_3$ may include some pixels which are occluded from the centre of the light $402$ and some pixels which are not occluded from the centre of the light $402$. So if the shadow indicators are averaged over the blending kernel $604_3$ the final value will be somewhere between 0 and 1, indicating that the pixel $612_3$ is in partial shadow from the light $402$, i.e. it is in the penumbra. Pixel $612_3$ is less in shadow than pixel $612_2$ so the blended shadow indication for pixel $612_3$ is lower than the blended shadow indication for pixel $612_2$.

Rays for which a distance is not recorded (e.g. the ray corresponding to position $412_4$ and pixel $612_4$) are fully lit, so no shadowing is applied to the corresponding pixels.

In the examples described above, for each of the pixels, the origin for casting a ray from the visible surface $404$ for the pixel is determined by projecting a centre position of the pixel in screen space into the scene and identifying a position on the visible surface corresponding to that central position. In other examples, the origins for casting rays from the visible surfaces for the pixels are jittered within projected footprints of the respective pixels. This jittering adds small amounts of noise to the shadow ray origins to break up geometry-edge aliasing. That noise is projected based on the way the screen pixel is transformed into world-space. For example, the jittering of an origin for casting a ray from the visible surface $404$ for a pixel may comprises adding a two dimensional noise value to the centre position of the pixel in screen space to determine a jittered pixel position, projecting the jittered pixel position into the scene and identifying a position on a plane corresponding to the visible surface $404$.

In other words, a 2-dimensional noise value is added to the pixel centre, then a new virtual ray (aka line) is calculated based on the camera focus point and the jittered location, and then that line is intersected with a plane-extended version of the surface $404$. This final point has whatever biases applied in order to overcome numerical imprecision, to ensure the shadow ray's (effect ray's) origin is on the visible side of the surface $404$. A lot of this calculation may be reused, depending on whether some of the intermediate values have already been calculated for some other purpose.

Figure 7:
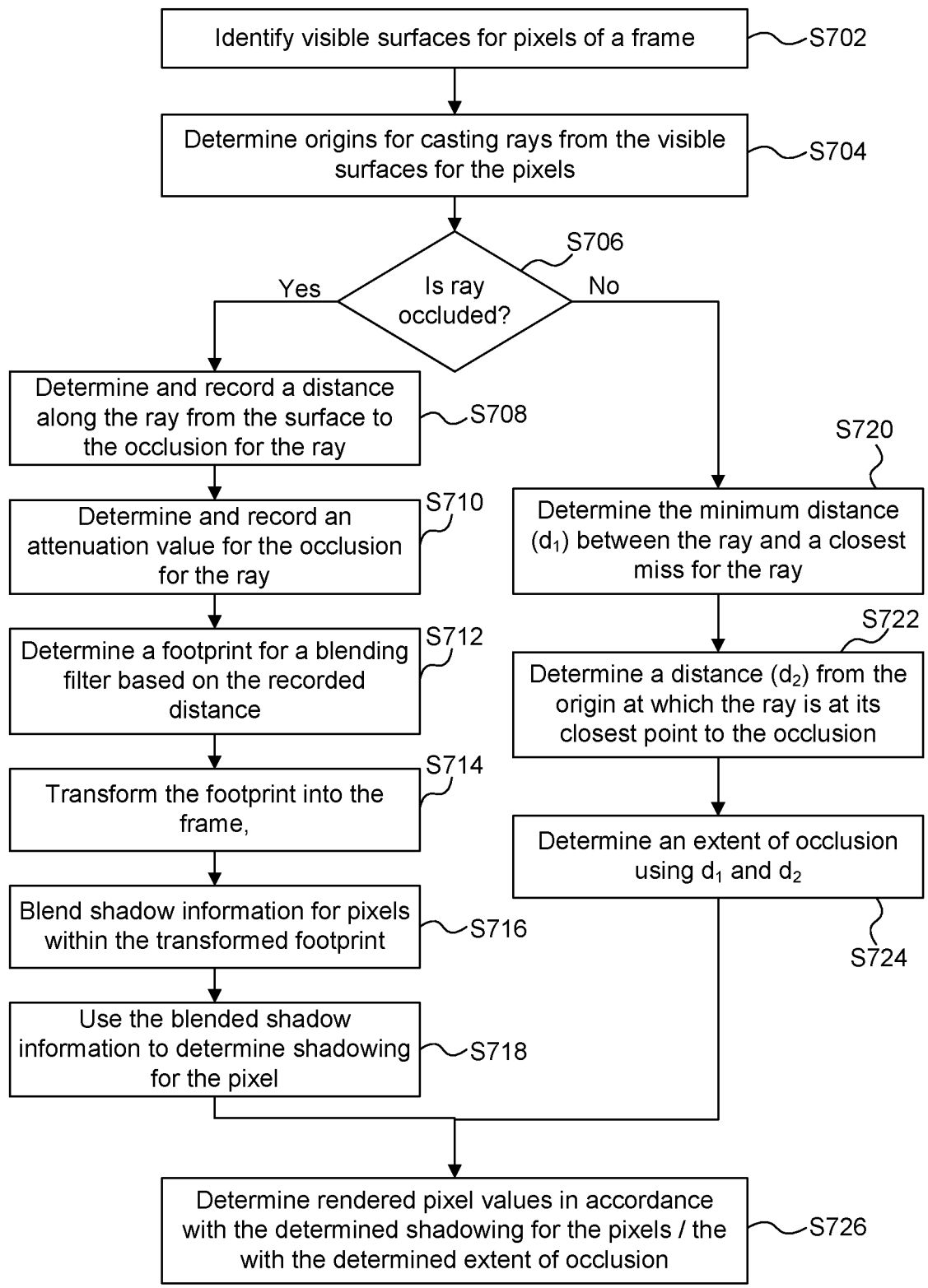
FIG. 7 is a flow chart for a method of graphics processing according to a second example.

FIG. 7 is a flow chart illustrating a different method for implemented soft shadow effects. The method shown in FIG. 7 is similar to that shown in FIG. 3, but the way shadowing is determined for rays that are not occluded from the centre of the light 402 is different.

Steps S702 to S706 generally correspond with steps S302 and S306 described above. Therefore, in step S702, visible surfaces are identified for pixels of a frame (e.g. the surface 404 is identified for the pixels $612_1$, $612_2$, $612_3$ and $612_4$). In step S704 origins for casting rays from the identified visible surfaces are determined for the pixels (e.g. the positions $412_1$ to $412_4$ are determined as origins for rays corresponding to the pixels $612_1$ to $612_4$). In step S706, for each of the rays it is determined whether the ray is occluded from reaching the centre of the light 402. If the ray is occluded then the processing for that ray continues from step S706 to step S708, whereas if the ray is not occluded then the processing for that ray continues from step S706 to step S720.

Figure 3:
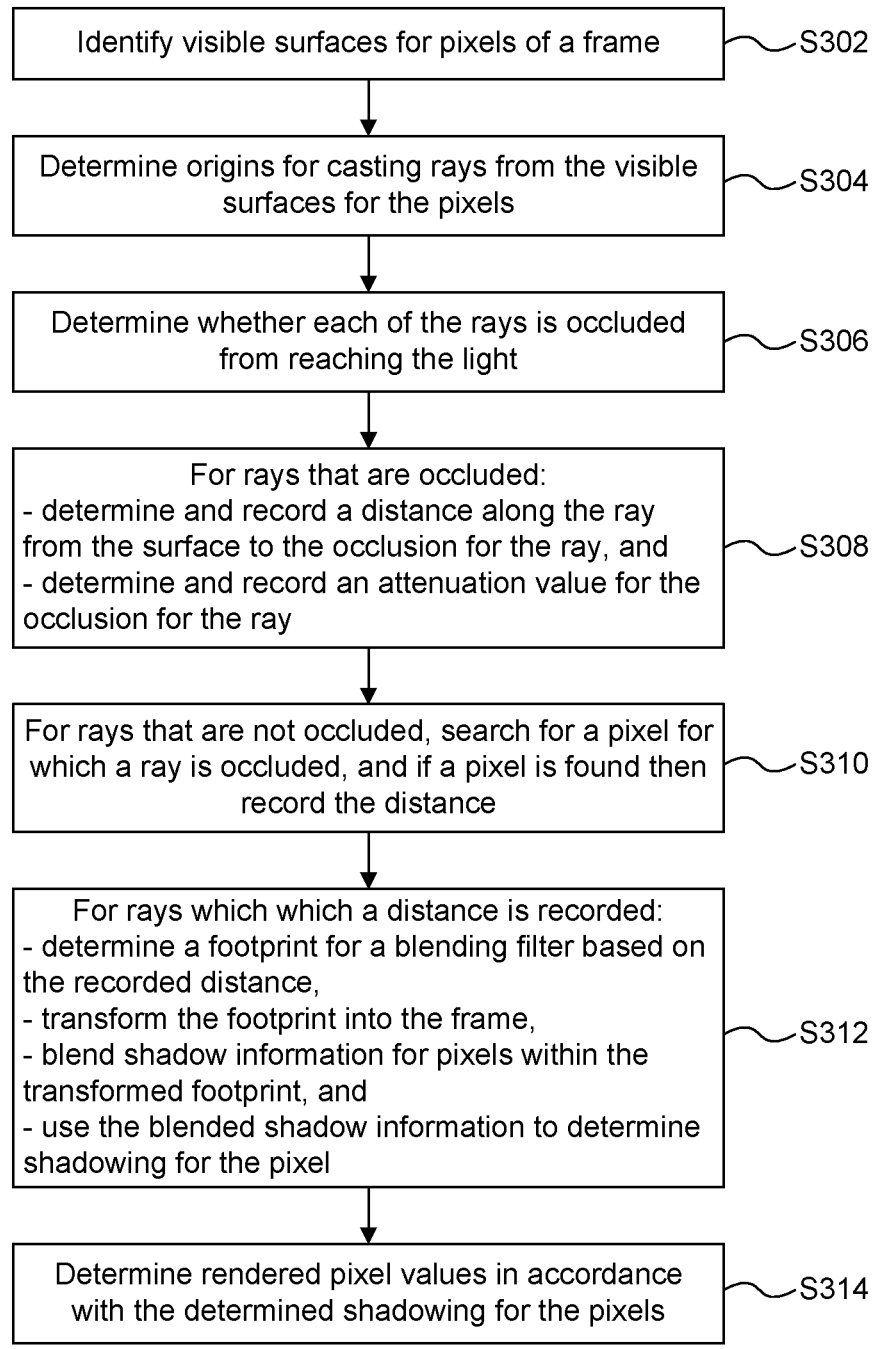
FIG. 3 is a flow chart for a method of graphics processing according to a first example.

Similarly to the example shown in FIG. 3, in the example method shown in FIG. 7, just one ray is cast from the position 412 corresponding to each pixel 612. This makes the examples described herein much simpler to implement than if multiple rays were cast from each position towards different parts of the area light 402. In particular, this may allow the methods described herein to be implemented in real-time and/or on devices, such as mobile devices, which may have tight constraints on the processing resources, physical size and/or power consumption of a graphics processing unit implemented thereon.

The rays which are occluded (e.g. the rays from positions $412_1$ and $412_2$) are processed in the same manner as described above with reference to FIG. 3. In brief, in step S708 a distance along the ray from the surface 404 to the occlusion 406 is determined and recorded in a buffer. In step S710 an attenuation value is determined and recorded for the occlusion 406. The attenuation value may be determined as described above. Furthermore, as described above, the use of attenuation values is an optional feature. In step S712 parameters for a blending filter (i.e. a blending kernel) are determined for a ray based on the recorded distance for the ray. For example the blending kernels $504_1$ and $504_2$ are determined for the positions $412_1$ and $412_2$. In step S714 The blending kernel for a ray is transformed into the frame. For example, the blending kernels $504_1$ and $504_2$ are transformed to determine the blending kernels $604_1$ and $604_2$ in the frame 602, for the pixels $612_1$ and $612_2$. In step S716 shadow information (e.g. binary flags indicating whether pixels are occluded from the centre of the light 402) is blended for pixels within a blending kernel. For example, the binary flags for pixels within the blending kernel $604_1$ are blended to determine a shadow value for pixel $612_1$. In step S718 these shadow values (i.e. the blended shadow information) are used to determine shadowing for the pixels from the light 402.

Figure 8A:
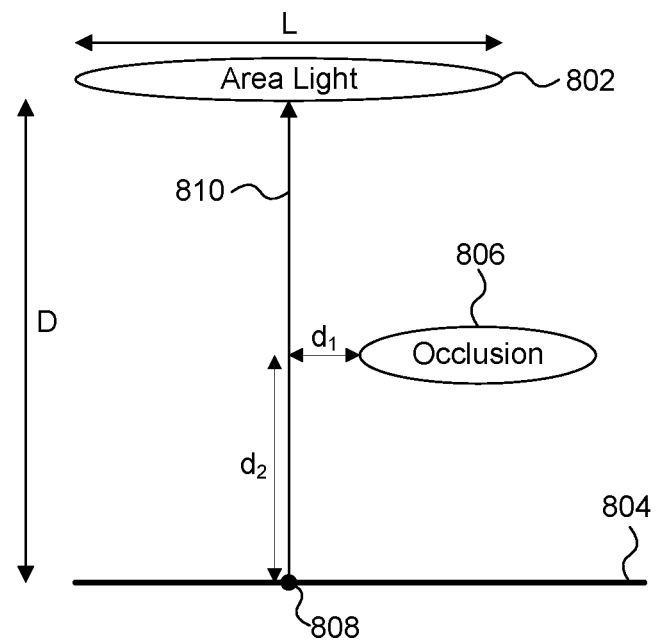
FIG. 8a is a first illustration of a ray which closely misses an occlusion.

However, for rays which are not occluded from the centre of the light 402, the method passes from step S706 to step S720. FIG. 8 shows an example of an area light 802, a visible surface 804 and an occlusion 806. A ray 810 has an origin at a position 808 on the visible surface 804. The ray 810 is not occluded from the centre of the light 802, so the method passes form step S706 to step S720 for the ray 810. The occlusion 806 is a closest miss for the ray 810. In other words, the ray 810 comes closer to hitting occlusion 806 than it comes to hitting any other element of geometry in the scene.

In step S720 the processing logic 208 determines a first distance ($d_1$) for a ray. The distance $d_1$ is a minimum distance between the ray and the element of geometry 806 which is a closest miss for the ray. The distance $d_1$ may be referred to as a "tangential distance". In order to determine the distance $d_1$, the processing logic 208 may use a signed distance field to determine the minimum distance between the ray and occlusion 806. When a ray is traced through a scene, signed distance fields may be used to determine whether, at points along the ray, the ray has intersected with the surface of an element of geometry in the scene. The sign of the results of the signed distance function at different points along a ray indicates whether the position of the ray is inside or outside an element of geometry. For a ray that does not intersect an element of geometry before reaching the light 802 (e.g. for ray 810), the result of the signed distance function with the lowest magnitude along the path of the ray indicates the minimum distance ($d_1$) to the element of geometry 806 which is a closest miss for the ray.

In step S722 the processing logic 208 determines a second distance ($d_2$) for the ray 810. The distance $d_2$ is the distance from the origin of the ray 808 at which the ray 810 is at its closest point to the occlusion 806. The distance $d_1$ may be referred to as a "directional distance". This distance is also easily determined from the signed distance function, i.e. it is the distance along the ray at which the result of the signed distance function has the lowest magnitude. The two distances, $d_1$ and $d_2$, represent an angle. In other words, the ratio between the two distances forms the arctangent of the angle of the cone that describes the solid angle from which light can reach the surface. When that solid angle is smaller than the solid angle of the light, the surface point is in penumbra.

The processing logic 208 may store the distances $d_1$ and $d_2$ for a ray in a buffer.

In step S724 the processing logic 208 determines an extent of occlusion from the light 802 for the pixel corresponding to the ray 810 using the determined distances $d_1$ and $d_2$ for the ray. For example, for a larger $d_1$ an extent of occlusion from the light 802 will be smaller; whilst for a larger $d_2$ an extent of occlusion from the light 802 will be larger. The extent of occlusion may be determined as a function of $d_1$ and $d_2$. The function for determining the extent of occlusion may also depend upon the distance (D) from the point 808 to the area light 802 and/or the spatial extent (L) of the area light 802. In other words, the determination of the extent of occlusion from the light 802 for the pixel corresponding to the ray 810 can be based on information relating to the light, such as: a position of the light 802 in the scene, a distance (D) of the light 802 from the origin 808 of the ray 810, a spatial extent (L) of the light 802 in the scene, and/or a spatial extent of the light as viewed along the direction of the ray 810.

When determining the extent of occlusion, the processing logic 208 is determining the extent to which the occlusion 806 (i.e. the nearest miss) occludes the light from the light 802, and therefore the opacity of the occlusion 806 can affect the extent of occlusion. As described above, an attenuation value may be determined for the occlusion 806, and the determination of the extent of occlusion from the light 802 for the pixel corresponding to the ray 810 may include determining an attenuation value for the element of geometry 806 which is a closest miss for the ray 810 and using the determined attenuation value to determine the extent of occlusion. As described above, an attenuation value for the occlusion 806 may be determined by processing a texture (which may include some translucency and/or punch-through) for the occlusion 806 to determine a level to which the occlusion 806 attenuates light. Furthermore, the determination of the attenuation value for the occlusion 806 may comprise casting a secondary ray from the occlusion 806 towards the light 802 to determine an extent to which the occlusion 806 is itself occluded from the light 802.

Step S726 follows from step S718 and follows from step S724. In step S726 the processing logic determines rendered pixel values of the frame. For rays that are occluded from the centre of the light, shadowing has been determined in step S718, and the processing logic determines rendered pixel values corresponding to these rays in accordance with the determined shadowing for the pixels. For rays that are not occluded from the centre of the light, an extent of occlusion has been determined in step S724, and the processing logic determines rendered pixel values corresponding to these rays in accordance with the determined extent of occlusion.

The rendered pixel values can be stored in the image buffer 210.

In some examples, rather than determining $d_1$ and $d_2$ explicitly in steps S720 and S722, a ratio (referred to herein as a "distance-ratio") can be determined which is correlated with the ratio of $d_2/d_1$. The calculation of the distance-ratio in the examples described below are easier to implement than methods of determining $d_1$ and $d_2$ explicitly as described above, and so are more suitable for use in real-time on a device with limiting processing resources (e.g. on a mobile device).

In particular, in order to perform intersection testing on primitives in the scene in a ray tracing implementation, a hierarchical acceleration structure is built which comprises a hierarchy of nodes representing regions of the world-space of the scene being rendered. The leaf nodes of the acceleration structure may represent one or more primitives or parts of primitives to be rendered in the scene. For example, during hierarchy generation, primitives in the scene may be voxelized into enclosing nodes, and those nodes are, in turn, voxelized into large enclosing nodes until all objects in the scene are enclosed in one or a small number of nodes. Hardware for voxelization is known and may for example use an octree structure for the voxelization so that each enclosing node is twice as large in each dimension as the nodes it encloses (8 times the volume). The voxel builder may, or may not, shrink nodes so that they extend in space only as far as is necessary to fully enclose the child nodes or primitives they bound. Different sets of triangles may be voxelized to different leaf-node resolutions. In other examples, the nodes of the hierarchical acceleration structure are not voxels, but can take any suitable shape and size to enclose lower-level nodes or primitives.

Figure 8B:
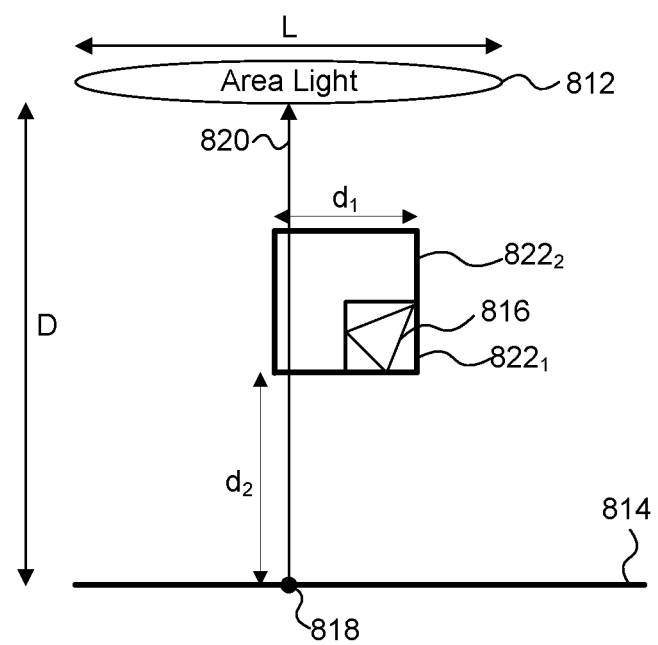
FIG. 8b is a second illustration of a ray which closely misses an occlusion, showing nodes of a hierarchical acceleration structure.

FIG. 8b shows a scene including a light 812, a visible surface 814 and an occluding primitive 816, which is shown as a triangle. A ray is cast from a position 818 on the surface 814 towards the centre of the light 812 and is not occluded. The primitive 816 is enclosed in a voxel 822$_1$ corresponding to a node of the hierarchical acceleration structure. The ray 820 does not intersect with the voxel 822$_1$. At one level higher within the hierarchical acceleration structure, a voxel 822$_2$ encloses the voxel 822$_1$. The ray 820 does intersect with the voxel 822$_2$.

The method can identify a nearest-hit primitive (e.g. primitive 816) by determining which of the nodes of the hierarchical acceleration structure to be hit by the ray has the smallest distance-ratio. The distance-ratio for a node is the ratio of a dimension of the node (e.g. $d_1$ illustrated in FIG. 8b) and the distance along the ray at which the ray hits the node (e.g. $d_2$ illustrated in FIG. 8b). The distance ratio may be given by $d_1/d_2$. A closest hit distance-ratio for a ray can be stored. Then nodes of the hierarchical acceleration structure can be descended for a primitive being tested if a current node corresponding to the test primitive at a current level is a hit for the ray and if the distance-ratio for the current node is smaller than the stored closest hit distance-ratio for the ray. The stored closest hit distance-ratio for the ray can then be updated in response to descending within the hierarchical acceleration structure. The node corresponding to voxel 822$_2$ is a hit, but the lower-level node corresponding to voxel 822$_1$ is not a hit. So if, primitive 816 is the closest hit primitive for the ray 820, then the node corresponding to voxel 822$_2$ represents the closest hit node, and the distance ratio that is stored at the end of the testing is the distance ratio for that node (i.e. $d_1/d_2$). If the ray hits a primitive it has a distance-ratio of zero.

The distance ratio maps to a solid angle, indicating how close the ray came to hitting a primitive. Therefore, this indicates the extent to which the position 818 is in shadow from the primitive 816. Either distance-ratio or the values of $d_1$ and $d_2$ for the closest node 822$_2$ can be provided to a shader for determining the extent of occlusion at the position 818.

In some examples, nodes of the hierarchical acceleration structure with the smallest distance-ratio are descended first to quickly drive the ray's distance-ratio to be as small as possible as quickly as possible, thereby pruning the search. This type of query favours depth-first traversal behaviours over breadth-first traversal.

A ray tracing process may trade-off between breadth-first and depth-first testing of the acceleration structure depending on the availability of various resources (e.g. on-chip memory) but this algorithm favours selecting more depth-first behaviours in more situations. One possible way to traverse the acceleration structure would be to test all of the child nodes of a box against the ray and only descend nodes that the ray missed in the circumstances that no hits were available in a given child list. Then, when misses are descended, begin with the deepest nodes in the tree, and recursively work upwards, either rejecting each box based on the ray's distance-ratio or descending it.

In this way, a traversal mechanism is implemented to determine near-miss information. This allows the extraction of data that is similar to that extracted from ordinary traversal of an acceleration structure (i.e. hit or miss of various nodes) to be used in determining the extent of occlusion at a position in the penumbra of an occluder's shadow. This is therefore a simple extension to a system which traverses hierarchical acceleration structures but does not implement soft shadows.

Furthermore, this method of determining the effects of dilation of a shadow (i.e. for regions of penumbra which would not be part of a hard shadow from an occlusion) by determining the "nearest miss" can be combined with the effects of erosion of a shadow (i.e. for regions of penumbra which would be part of a hard shadow from an occlusion) that are determined from filtering as described above.

Figure 9:
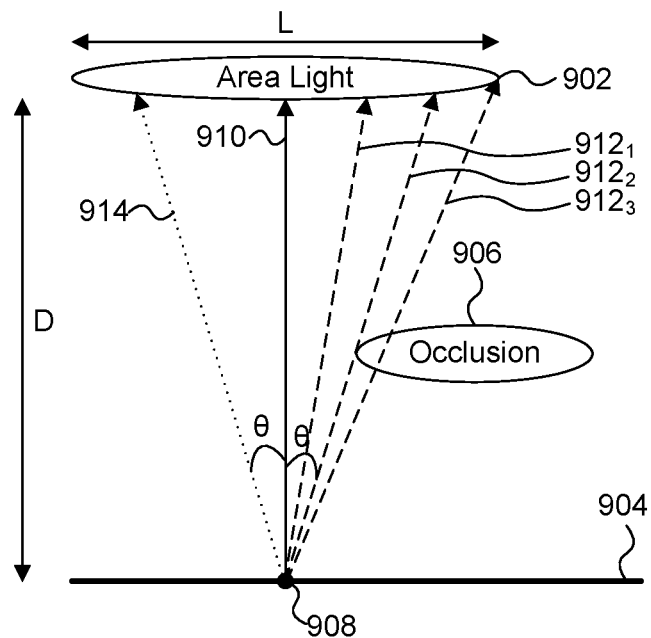
FIG. 9 is a third illustration of a ray which closely misses an occlusion.

FIG. 9 shows another example scene including an area light 902, a visible surface 904 and an occlusion 906. A ray 910 has an origin at a position 908 on the visible surface 904. The ray 910 is not occluded from the centre of the light 902. The occlusion 906 is a closest miss for the ray 910. In other words, the ray 910 comes closer to hitting occlusion 906 than it comes to hitting any other element of geometry in the scene.

Similar to the methods described above, visible surfaces of the scene for pixels of a frame of pixels can be determined and origins for casting rays from the visible surface towards the centre of the light 902 can be determined for each pixel. For one or more of the pixels, multiple test rays can be cast from the determined origin for the pixel towards different points within the area light. For example, FIG. 9 shows three test rays ($912_1$, $912_2$ and $912_3$) which are cast from the position 908 on the surface 904 towards different parts of the light 902. It is noted that any number of test rays may be cast, and for example many more than three test rays may be cast from a particular position on the surface 904 towards different parts of the light 902. The processing logic 208 can determine whether each of the test rays 912, as well as the main ray 910, are occluded from reaching the area light 902. For example, the ray 910 is not occluded, the test ray $912_1$ is not occluded, and the test ray $912_3$ is occluded. The test ray $912_2$ is a glancing ray which just glances the edge of the occlusion 906. In other words, the glancing ray is the closest of the test rays 912 to the occlusion 906 which is not occluded by the occlusion 906. The processing logic 208 uses the results of determining whether the test rays 912 are occluded from reaching the area light 902 to determine an extent of occlusion from the light 902 for the pixel. For example, the glancing ray $912_2$ can be determined, and an angle (θ) between the glancing ray $912_2$ and the ray 910 cast towards to the centre of the area light 902 is used to determine an extent of occlusion from the light 902 for the pixel. For example, this angle (θ) may define an unoccluded conic section which can be used to represent a portion of the light 902 that is unoccluded. The conic section has edges along the lines $912_2$ and 914 shown in FIG. 9, where line 914 makes the same angle θ with the ray 910 but on the opposite side to the glancing ray $912_2$. Therefore the conic section has a nose angle of 2θ, and the area of this conic section at the intersection with the light 910 can be used to determine the extent of occlusion from the area light 902. For example, if the area light 902 can be modelled as a disc with diameter L, it has an area of $$\frac{\pi}{4}L^2.$$

The area of the conic section at the intersection with the light 910 is $\pi(\tan\theta)^2 D^2$. Therefore the proportion of the area light 902 that intersects with the conic section is given by $$\left(\frac{2D\tan\theta}{L}\right)^2,$$

and this can be used to determine a proportion of the light from area light 902 which hits the position 908. This can be used to determine the shadowing to be applied to the pixel corresponding to the position 908 when rendering the pixel. The method shown in FIG. 9 may be used for all pixels in the frame or only for pixels for which rays are not occluded from the centre of the light 902.

In the examples described above there is a single source of light. However, in some examples, a scene may be lit by multiple light sources. For example, FIG. illustrates three light sources $1002_1$, $1002_2$ and $1002_3$ which can illuminate a surface 1004 in the scene. The position 1108 is: fully lit by the light $1002_1$, in the penumbra of the shadow for the light $1002_2$ caused by the occlusion 1006, and in the umbra of the shadow for the light $1002_3$ caused by the occlusion 1006. In other examples there may be any number of light sources illuminating the scene, e.g. many more than three. An occlusion 1006 is present in the scene.

Figure 11:
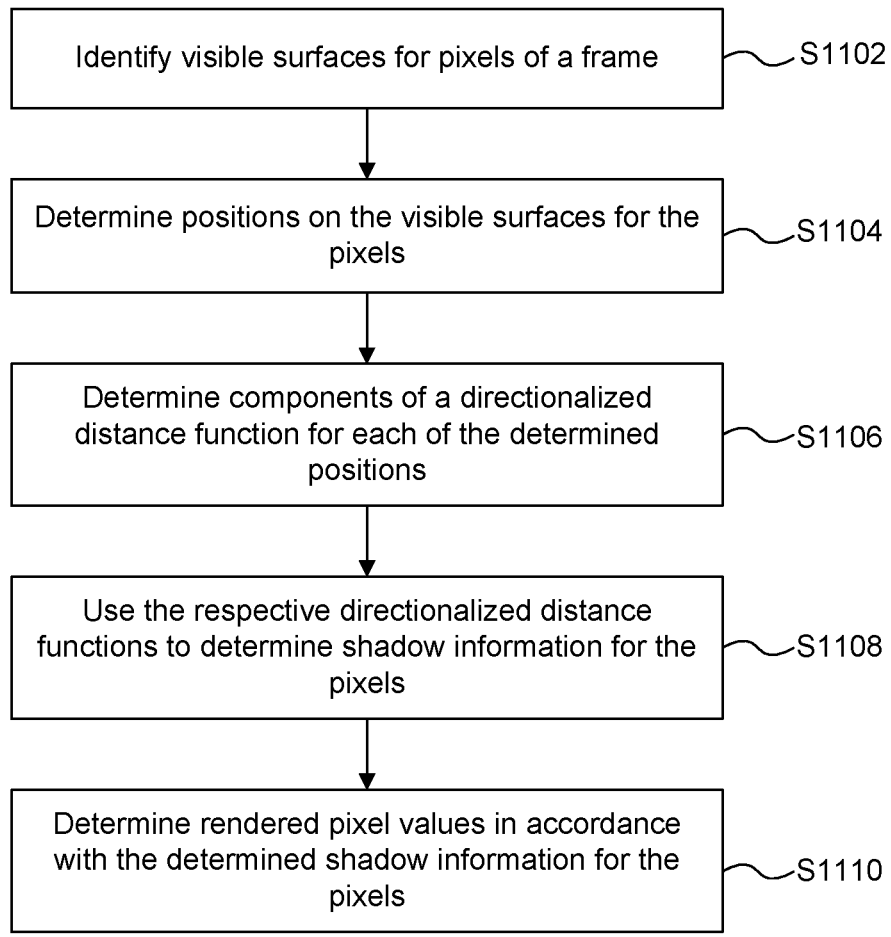
FIG. 11 is a flow chart for a method of graphics processing according to a third example.

A method of rendering pixels of a view of the scene is shown in FIG. 11. This method is particularly suited for use with scenes that are lit by multiple light sources, but it could be applied for use with scenes that are lit by a single light source. In step S1102 the surface identification logic 206 identifies visible surfaces for pixels of a frame (e.g. the surface 1004 may be identified). In step S1104 the processing logic 208 determines positions on the identified surfaces corresponding to each of the pixels of a frame to be rendered. The determined positions represent origins for casting rays from the identified visible surfaces for the pixels. For example, the position 1008 on the surface 1004 is determined for a pixel.

In step S1106 the processing logic 208 determines, for each of the determined positions for the pixels, components of a directionalized distance function which indicates a direction-dependent distance to one or more occlusions of light in the scene for the position.

Figure 10:
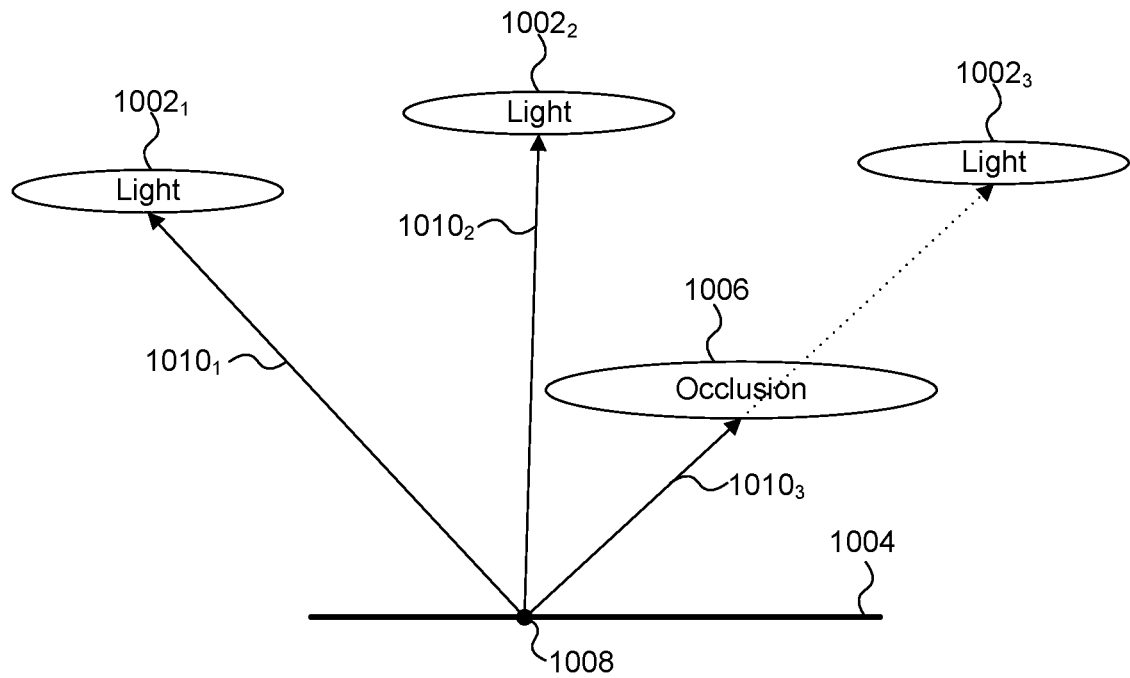
FIG. 10 illustrates a surface in a scene being illuminated by multiple lights.

For example, step S1106 may comprise performing processing for each of the lights 1002 for a particular position (e.g. position 1008). For example, for each of the lights (e.g. lights $1002_1$, $1002_2$ and $1002_3$) a ray is cast from the determined position 1008 on the identified visible surface 1004 in a direction towards the light. These rays are shown in FIG. 10 as $1010_1$, $1010_2$ and $1010_3$ respectively. The processing logic 208 determines whether each of the rays is occluded from reaching the centre of the respective light. For example, rays $1010_1$ and $1010_2$ are not occluded by the occlusion 1006, but ray $1010_3$ is occluded by the occlusion 1006. In this example, for each of the rays that are determined to be occluded from the respective light (e.g. for ray $1010_3$), the processing logic 208 records a distance along the ray from the surface 1004 to its respective occlusion. Then for the position 1008, the processing logic 208 combines the recorded distances to occlusions for the lights to thereby determine the components of the directionalized distance function for the determined position.

For example, the directionalized distance function could be a spherical harmonic function such that the components are spherical harmonic components. As another example, the components of the directionalized distance function could be defined with respect to a three-dimensional Cartesian coordinate system.

For each of the rays that are determined to be not occluded from the respective light (e.g. rays $1010_1$ and $1010_2$), the processing logic 208 can perform methods similar to those described above. For example the processing logic 208 may search for a pixel for which a ray is determined to be occluded from the light, and if a pixel is found in the search, record the distance that was recorded for the ray of the found pixel. As described above, this searching for a pixel may comprise searching, within a search region for the pixel, for a closest pixel in the frame of pixels for which a ray is determined to be occluded from the light. In this way a distance to an occlusion for a particular light can be based on a corresponding distance to an occlusion for the particular light for a nearby pixel.

Rather than determining the distance to occlusions in the directions of the lights, the determinations could be made in sampling directions. The sampling directions may or may not be directions towards a light. The sampling directions may be selected stochastically or in accordance with a predetermined pattern. For example, the sampling directions could be the positive and negative directions along each of the three axes of a Cartesian coordinate system. This can be beneficial if there are lots of lights (e.g. over twenty lights) illuminating a scene. In this way, for each of a plurality of sampling directions a ray is cast from a determined position (e.g. position 1008) on the identified visible surface (e.g. 1004) in the sampling direction. The processing logic 208 determines whether each of the rays is occluded from reaching a light in the sampling direction, and for each of the rays that are determined to be occluded from a light in the sampling direction, a distance along the ray from the surface to its respective occlusion is recorded. Then, for each of the determined positions for the pixels, the processing logic 208 combines the recorded distances to occlusions for the sampling directions to thereby determine the components of the directionalized distance function for the determined position.

In step S1108 the processing logic 208 uses the determined components of the directionalized distance function and information relating to said one or more lights 1002 to determine shadow information for pixels in the frame. For example, each of the lights 1002 may be processed separately and then the shadowing effects from the different lights 1002 for a pixel can be combined to determine a final lighting for the pixel. For example, for each of the lights, the processing logic 208 can use the determined components of the directionalized distance function to estimate a distance to an occlusion, if any, in the direction of the light for each of the pixels. Pixels for which a distance to an occlusion is estimated can be processed as in the examples described above, i.e. parameters for a blending filter (i.e. a blending kernel) can be determined based on the estimated distance for the pixel, that blending kernel can be transformed into the frame of pixels, and shadow information for pixels in the frame of pixels that are within the transformed footprint can be blended. Then for each of a plurality of pixels in the frame, the blended shadow information for the pixel determined for the lights 1002 can be combined to thereby determine shadowing for the pixel.

As described above, the shadow information for a pixel for a light may be based on whether a ray cast from the determined position for the pixel is occluded from reaching the light. Furthermore, as described above, the shadow information for a pixel for which a ray is occluded from the light may be further based on an attenuation value for its respective occlusion, wherein the attenuation value for an occlusion may be determined as described above, e.g. by processing a texture for the occlusion to determine a level to which the occlusion attenuates light and/or by casting a secondary ray from the occlusion towards the light to determine an extent to which the occlusion is itself occluded from the light.

In step S1110 the processing logic 208 determines rendered pixel values of the frame in accordance with the determined shadowing for the pixels. The rendered pixel values can be stored in the image buffer 210.

The spherical harmonics (or other directionalized representation) of the distance function enables shadow information for multiple lights to be stored in one buffer or in a set of buffers. This is an extension to the technique where the distance value isn't a scalar representing a distance along a vector toward a light source, but rather a multi-component number which can be treated as a function where the function input is a direction vector and the output is an approximation of the distance to the nearest occluder along that vector. One such example of a representation like this is spherical harmonics coefficients. Another example is a function representing six vectors that are the + and − directions along each cardinal axis.

The values of the coefficients of the distance function can be computed several ways. For example, as described above, each relevant shadow-casting light (light not excluded by other criteria like distance, normal, etc.) can be sampled for every visible surface point using a shadow ray, and the results can be integrated into the spherical harmonic coefficients for that surface point. For a very complex lighting environment, it may be less expensive to use shadow rays to sample omnidirectionally (or hemispherically) in a stochastic or even a fixed pattern. Another option would be to sample a representative subset of the lights. It would also be possible to compute these coefficients by projecting the geometry from the light's perspective in a technique similar to shadow mapping.

A portion of the spherical harmonic's range (or that of an alternative representation) can be saved by storing only a hemisphere instead of a full 3d direction. This is because the point being shadowed or lit fundamentally has a normal vector and therefore is only exposed to lighting from half of the possible directions. While this substantially cuts down on storage, it means that the coefficients need to be transformed in order to interpolate or average between two or more data points in 3D space, so in some examples it is more computationally efficient to store the full spherical representation of the spherical harmonics data.

When a directional distance buffer (as opposed to a scalar distance buffer) has been calculated, this can be used in different ways to determine the shadowing in the scene. As described above, one option is to iterate over each of the shadowing lights and compute the approximate distance to a possible occluder in the direction of that light from the spherical harmonic function, and then process that distance as described in the examples given above, performing the lighting calculation for every light. This is well suited for processing scenes which have a low number of light sources affecting a given pixel or surface point. It allows the lights to have different properties (light colours, softnesses, etc.) A variation of this technique could be applied to situations with many more lights by sampling representative subsets of lights or by combining multiple lights into groups that are handled as a single light source.

Another option for using the directional distance buffer is to carry shadow intensity in a directionalized form. In this case, shadow intensity is really the inverse: light intensity prior to any filtering for softness. To do this, the filtering steps would be carried out a fixed number of times with different canonical directions, and the result of the final filter operations would be blended together. This would be appropriate for a lighting environment where between a half-dozen up to thousands of shadow casting lights could affect a location at the same time.

Figure 12:
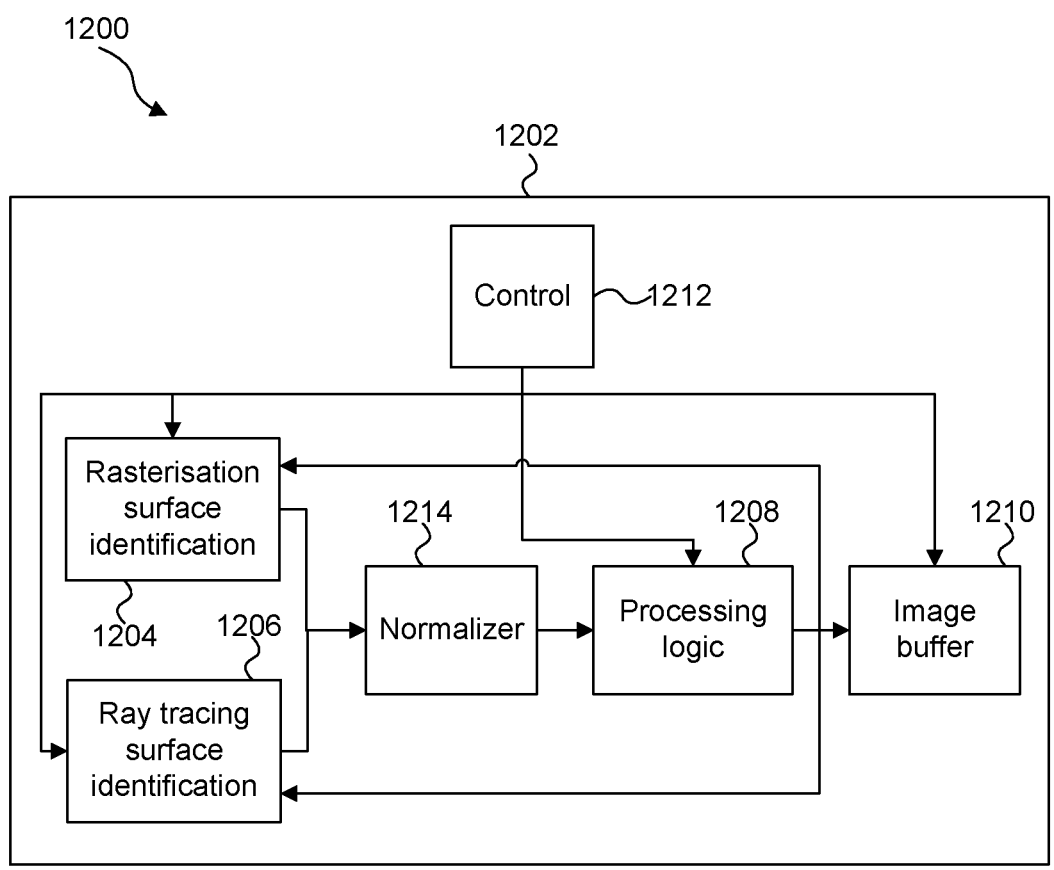
FIG. 12 shows a hybrid graphics processing system.

Hybrid rendering systems are described in detail in the previous U.S. patent application Ser. No. 13/953,754 (published as US 2014/0063016 A1). Hybrid rendering systems allow ray tracing logic and rasterisation logic to share some processing resources on the GPU. FIG. 12 illustrates an example of a GPU 1202 implementing a hybrid rendering system 1200. The GPU 1202 is similar to the GPU 202, but includes two surface identification logic blocks: rasterisation surface identification logic 1204 and ray tracing surface identification logic 1206, and a normaliser 1214, in addition to processing logic 1208, an image buffer 1210 and control logic 1212.

The GPU 1202 may provide a unified computation resource for performing shading work concurrently for surfaces identified by both ray tracing and by rasterisation techniques. For example, a unified computation resource executes shaders based on a normalized set of inputs, and a given surface is shaded by an associated shader module, regardless whether that surface is to be shaded responsive to a ray intersection or during rasterisation. In another example, different shader code modules may exist for shading ray tracing intersections and for rasterisation. In this example, surface shaders for rasterisation may emit rays to be intersection tested, and perform shading, in dependence on the results of intersection testing that ray.

Regardless whether 3-D rendering is being performed using rasterisation techniques or ray tracing (or both), two principal categories of activities to be performed are (1) identifying surfaces of 3-D scene geometry that may need to be shaded or otherwise processed during rendering of a 2-D image; and (2) determining what effect that surface should have on an image being rendered. These constituent operations may have different processing, data access, and data flow implications for rasterisation and for ray tracing.

The rasterisation surface identification logic 1204 uses rasterisation techniques to identify surfaces of 3-D scene geometry that may need to be shaded. This may involve performing depth tests at each sample position on primitives (e.g. triangles) which overlap the sample position to determine which primitive is visible at each sample position. Indications of the identified surfaces at each sample position are provided to the normaliser 1214.

The ray tracing surface identification logic 1206 uses ray tracing techniques to identify surfaces of 3-D scene geometry that may need to be shaded. This may involve tracing a ray for each sample position through the scene and performing intersection tests on the primitives in the scene to determine which primitive is intersected at each sample position. Indications of the identified surfaces at each sample position are provided to the normaliser 1214, from one or other of the surface identification logic blocks 1204 or 1206.

The format of the data received at the normaliser 1214 may be different depending on whether the data is received from the rasterisation surface identification logic 1204 or the ray tracing surface identification logic 1206. The normaliser processes the data to form a normalised set of shader inputs, which has a common format regardless of whether the surface is to be shaded responsive to a ray intersection or during rasterisation. The normalised set of shader inputs is passed to the processing logic 1208 which processes the data to determine rendered pixel values for a frame. The processing performed by the processing logic 1208 may be include executing one or more shader programs on execution cores to determine what effect the identified surfaces should have on an image being rendered. Shadow effects can be introduced in the rendered pixel values as described above. The execution of a shader program may cause further tests to be performed by the surface identification logic 1204 and/or 1206. For example, the execution of a shader may cause one or more new rays to be emitted (e.g. to model a reflection), and these rays are passed back to the ray tracing surface identification logic 1206 to determine which surfaces the emitted rays intersect. As another example, some geometry which is processed using a rasterisation technique may have a translucent or a "punch through" object type. Conceptually, punch through objects include primitives which may have holes in them. In this case the result of executing a shader at the processing logic 1208 may result in another pass through the rasterisation surface identification logic 1204 to determine image values to be blended with translucent primitives or to be rendered in the sample positions corresponding to the holes of punch through primitives.

For rendering some sample positions, a rasterisation process may begin by identifying a surface which is visible at the sample position (at the rasterisation surface identification logic 1204) then the execution of a shader at the processing logic 1208 may emit a ray which can then be processed using a ray tracing technique. Therefore, both ray tracing and rasterisation may be used to render a particular image value at a particular sample position.

The control logic 1212 can control the operation of the rasterisation surface identification logic 1204, the ray tracing surface identification logic 1206, the processing logic 1208 and the image buffer 1210, e.g. so that the shadowing effects described herein are applied to the rendered pixel values.

It is noted that the above examples are described with respect to applying shadowing effects to a rendered frame. Similar methods can be used for applying other effects, such as reflections and depth of field effects, with a difference being that the surface property and not the light size dictates how much the softness increases proportionally with occlude distance.

In the example of a reflection, a ray would be cast along a direction calculated using the Euclidean reflection calculation, or alternatively by evaluating a function for the surface material, e.g. a BRDF. That ray would then cause the distance to the first visible object to be recorded, and finally blur kernel parameters could be calculated from the distance to the reflected object and the glossiness property of the material. Just as above, the kernel would need to be projected into screen space, and evaluated as to avoid unintentionally blurring across image-space discontinuities caused by different visible objects, material changes, large changes in depth, etc.

Figure 13:
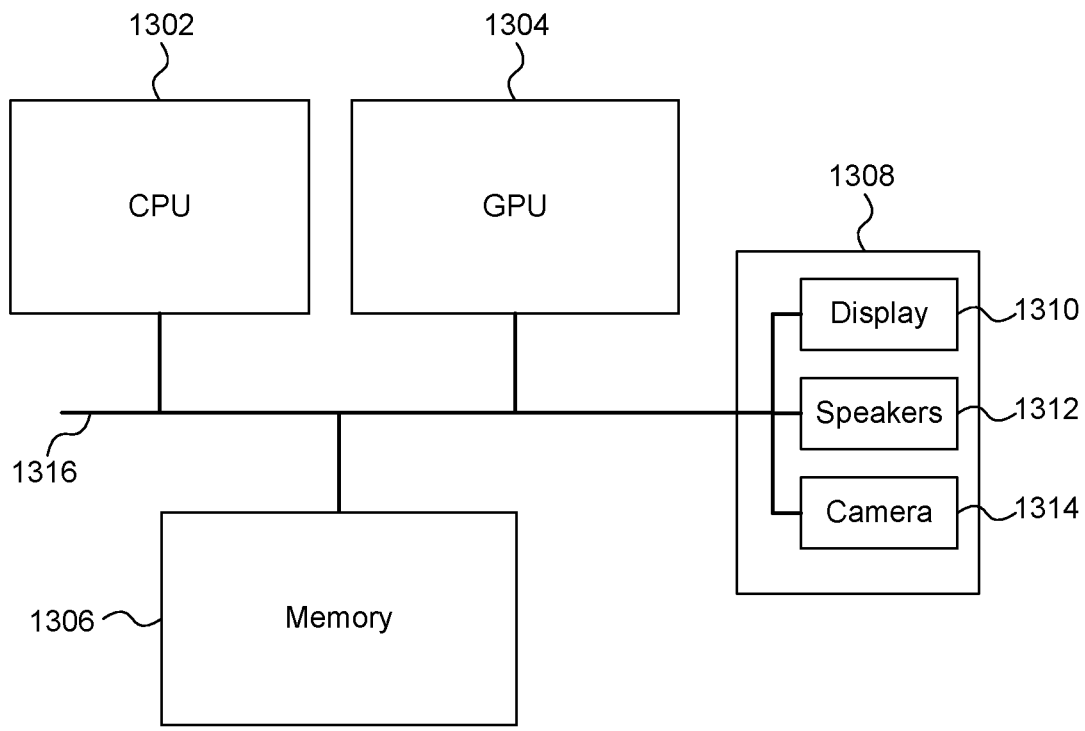
FIG. 13 shows a computer system in which a graphics processing system is implemented.

FIG. 13 shows a computer system in which the graphics processing systems described herein may be implemented. The computer system comprises a CPU 1302, a GPU 1304, a memory 1306 and other devices 1308, such as a display 1310, speakers 1312 and a camera 1314. The GPU 1304 may correspond with the GPU 202 or the GPU 1202 described above. The memory 1306 may correspond with the memory 204 described above. The components of the computer system can communicate with each other via a communications bus 1316.

The graphics processing units of FIGS. 2 and 12 are shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 14.

Figure 14:
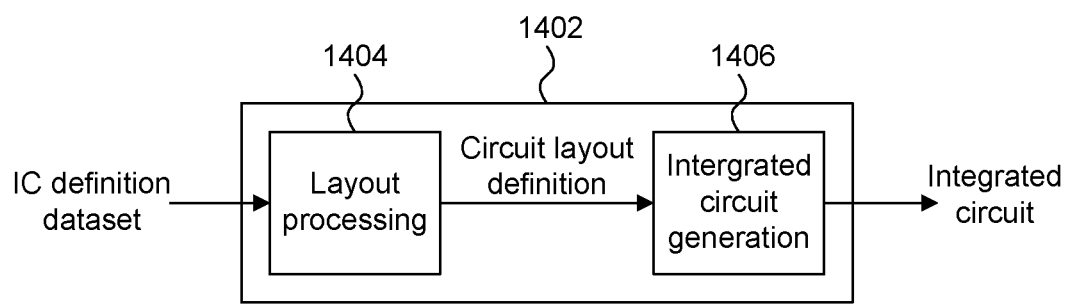
FIG. 14 shows an integrated circuit manufacturing system for generating an integrated circuit embodying a graphics processing system.

FIG. 14 shows an example of an integrated circuit (IC) manufacturing system 1402 which comprises a layout processing system 1404 and an integrated circuit generation system 1406. The IC manufacturing system 1402 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 1402 to manufacture an integrated circuit embodying a graphics processing unit as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A machine-implemented method of graphics processing, comprising:
    determining whether a plurality of rays cast from surfaces in a scene are occluded from reaching a light, wherein each ray of the plurality of rays is associated with one or more pixels;
    for rays that are determined to be occluded from the light, recording a distance to its respective occlusion;
    for rays that are determined to be not occluded from the light, searching for one or more pixels associated with a ray that is determined to be occluded from the light, and if at least one pixel is found in the search, recording a distance based on one or more of the distances recorded for the at least one found pixel; and
    for rays for which a distance is recorded, using the recorded distance for the ray to determine shadowing for the one or more pixels associated with the ray.

2. The machine-implemented method of claim 1, wherein said searching for one or more pixels comprises searching, within a search region, for one or more closest pixels associated with a ray that is determined to be occluded from the light.

3. The machine-implemented method of claim 1, wherein said searching for one or more pixels comprises:
    performing a discontinuity check for a pixel within a search region; and
    if the pixel fails the discontinuity check then excluding the pixel from the search.

4. The machine-implemented method of claim 3, wherein said performing a discontinuity check comprises one or more of: (i) comparing depths of different pixels in the search region, and (ii) comparing normals of different pixels in the search region.

5. The machine-implemented method of claim 1, wherein the one or more pixels are of a frame of pixels, and wherein said using the recorded distance for the ray to determine shadowing for the one or more pixels associated with the ray comprises:
    determining a blending region for a blending filter based on the recorded distance for the ray;
    transforming that blending region into the frame of pixels;
    blending shadow information for pixels in the frame of pixels that are within the transformed blending region; and
    using the blended shadow information to determine shadowing for the one or more pixels associated with the ray.

6. The machine-implemented method of claim 5, wherein the shadow information for a pixel comprises an indication of whether the ray associated with that pixel is occluded from reaching the light.

7. The machine-implemented method of claim 1, further comprising, for rays that are determined to be occluded from the light:
    determining an attenuation value for its respective occlusion and recording the determined attenuation value, wherein said shadowing for the one or more pixels associated with a ray is based on one or both of: (i) whether the ray is occluded from reaching the light, and (ii) the recorded attenuation value for the ray.

8. The machine-implemented method of claim 7, wherein said determining an attenuation value for an occlusion comprises processing a texture for the occlusion to determine a level to which the occlusion attenuates light.

9. The machine-implemented method of claim 8, wherein if the texture for the occlusion is opaque, the occlusion is determined to completely attenuate light, whereas if the texture for the occlusion is translucent or punch through then the level of attenuation is variable and is determined by sampling the texture.

10. The machine-implemented method of claim 7, wherein said determining an attenuation value for an occlusion comprises casting a secondary ray from the occlusion towards the light to determine an extent to which the occlusion is itself occluded from the light.

11. The machine-implemented method of claim 7, wherein said determining an attenuation value for an occlusion comprises:
    tracking the spread of the ray;
    determining an area of the intersection of the ray with its respective occlusion; and
    analysing the area of the intersection to determine the attenuation value.

12. The machine-implemented method of claim 1, further comprising:
    identifying visible surfaces of the scene for pixels of a frame of pixels; and
    determining origins for casting rays from the visible surfaces associated with one or more pixels towards the light.

13. The machine-implemented method of claim 12, wherein the origin for casting a ray from the visible surface associated with a pixel is determined by projecting a centre position of a footprint of the pixel in screen space into the scene and identifying a position on the visible surface.

14. The machine-implemented method of claim 12, wherein the origins for casting rays from the visible surfaces associated with the pixels are jittered within footprints for the respective pixels, wherein jittering an origin for casting a ray from the visible surface for a pixel comprises adding a two dimensional noise value to the centre position of the pixel in screen space to determine a jittered pixel position, projecting the jittered pixel position into the scene and identifying a position on a plane corresponding to the visible surface.

15. The machine-implemented method of claim 1, further comprising determining rendered pixel values of a frame of pixels in accordance with the determined shadowing for the pixels.

16. A graphics processing unit configured to:
determine whether a plurality of rays cast from surfaces in a scene are occluded from reaching a light, wherein each ray is associated with one or more pixels;
for rays that are determined to be occluded from the light, record a distance to its respective occlusion;
for rays that are determined to be not occluded from the light, search for one or more pixels associated with a ray that is determined to be occluded from the light, and if at least one pixel is found in the search, record a distance based on one or more of the distances recorded for the at least one found pixel; and
for rays for which a distance is recorded, use the recorded distance for the ray to determine shadowing for the one or more pixels associated with the ray.

17. The graphics processing unit of claim 16, further comprising:
surface identification logic configured to identify surfaces within the scene; and
processing logic configured to process graphics data for identified surfaces.

18. The graphics processing unit of claim 17, wherein the processing logic is configured to search for one or more pixels by:
performing a discontinuity check for a pixel within a search region; and
if the pixel fails the discontinuity check then excluding the pixel from the search.

19. The graphics processing unit of claim 16, further configured to, for rays that are determined to be occluded from the light:
determine an attenuation value for its respective occlusion by processing a texture for the occlusion to determine a level to which the occlusion attenuates light; and
record the determined attenuation value, wherein the shadowing for the one or more pixels associated with a ray is based on one or both of: (i) whether the ray is occluded from reaching the light, and (ii) the recorded attenuation value for the ray.

20. A non-transitory computer readable storage medium having stored thereon processor executable instructions that when executed cause at least one processor to:
determine whether a plurality of rays cast from surfaces in a scene are occluded from reaching a light, wherein each of the rays is associated with one or more pixels;
for rays that are determined to be occluded from the light, record a distance to its respective occlusion;
for rays that are determined to be not occluded from the light, search for one or more pixels associated with a ray that is determined to be occluded from the light, and if at least one pixel is found in the search, record a distance based on one or more of the distances recorded for the at least one found pixel; and
for rays for which a distance is recorded, use the recorded distance for the ray to determine shadowing for the one or more pixels associated with the ray.

* * * * *